United States Patent
Otani et al.

(10) Patent No.: US 12,243,366 B2
(45) Date of Patent: Mar. 4, 2025

(54) SERVER DEVICE, SYSTEM, AND CONTROL METHOD FOR SERVER DEVICE

(71) Applicant: NEC Corporation, Tokyo (JP)

(72) Inventors: Takumi Otani, Tokyo (JP); Atsushi Ikawa, Tokyo (JP); Junichi Inoue, Tokyo (JP); Takeshi Sasamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

(21) Appl. No.: 18/011,242

(22) PCT Filed: Jun. 26, 2020

(86) PCT No.: PCT/JP2020/025328
§ 371 (c)(1),
(2) Date: Dec. 19, 2022

(87) PCT Pub. No.: WO2021/260940
PCT Pub. Date: Dec. 30, 2021

(65) Prior Publication Data
US 2023/0298418 A1 Sep. 21, 2023

(51) Int. Cl.
*G07C 9/25* (2020.01)
*G07C 9/10* (2020.01)

(52) U.S. Cl.
CPC .............. *G07C 9/257* (2020.01); *G07C 9/10* (2020.01)

(58) Field of Classification Search
CPC .. G07C 9/257; G07C 9/10; G07C 9/27; G06F 21/32; G06F 16/955; H04L 63/0861
See application file for complete search history.

(56) References Cited

U.S. PATENT DOCUMENTS

| | | | | |
|---|---|---|---|---|
| 2005/0137916 A1* | 6/2005 | McElhannon | ......... | G06Q 50/14 705/5 |
| 2010/0123004 A1* | 5/2010 | Felkel | ...................... | G07C 9/27 235/382 |
| 2014/0002236 A1* | 1/2014 | Pineau | ............... | G07C 9/00309 340/5.6 |
| 2015/0178581 A1* | 6/2015 | Aoki | ...................... | G06F 18/22 382/115 |

(Continued)

FOREIGN PATENT DOCUMENTS

| JP | 2007-079656 A | 3/2007 |
|---|---|---|
| JP | 2017-151832 A | 8/2017 |

(Continued)

OTHER PUBLICATIONS

International Search Report for PCT Application No. PCT/JP2020/025328, mailed on Sep. 29, 2020.

*Primary Examiner* — Vernal U Brown

(57) ABSTRACT

Provided is a server device that achieves highly accurate biometric authentication. This server device includes a management unit, and a processing unit. The management unit manages a database that stores biometric information about each of a plurality of users. The processing unit processes an authentication request from each of a plurality of terminals, including a gate device at a final stage of a series of procedures, with reference to the database. When a first user who has succeeded in authentication passes through the gate device, the management unit invalidates an entry of the first user stored in the database.

13 Claims, 21 Drawing Sheets

(56) References Cited

U.S. PATENT DOCUMENTS

2020/0168017 A1* 5/2020 Prostko .............. G07C 9/00896
2021/0390811 A1* 12/2021 Learmonth ......... H04L 63/0442

FOREIGN PATENT DOCUMENTS

| JP | 2020-057201 A | 4/2020 |
| WO | 2018/181968 A1 | 10/2018 |
| WO | 2020/026368 A1 | 2/2020 |

* cited by examiner

Fig. 6

| CHECK-IN TERMINAL IDENTIFIER | BOARDING PASS INFORMATION | PASSPORT INFORMATION | BIOMETRIC INFORMATION | ... |
|---|---|---|---|---|

TOKEN ISSUE REQUEST

Fig. 10

TOKEN ID INFORMATION DATABASE

| TOKEN ID | REGISTERED FACE IMAGE | FEATURE AMOUNT | ISSUE TIME | DEVICE NAME | INVALIDATION FLAG | INVALIDATION TIME | ... |
|---|---|---|---|---|---|---|---|
| ID01 | F1 | Fv1 | 12:01:01 | D1 | 0 | — | ... |
| ID02 | F2 | Fv2 | 12:02:02 | D2 | 1 | 18:00:02 | ... |
| ID03 | F3 | Fv3 | 12:03:03 | D3 | 0 | — | ... |
| ... | ... | ... | ... | ... | ... | ... | ... |

Fig. 11

TASK INFORMATION DATABASE

| TOKEN ID | PASSENGER NAME | DEPARTURE PLACE | DESTINATION | AIRLINE CODE | FLIGHT NUMBER | OPERATION DATE | ... |
|---|---|---|---|---|---|---|---|
| ID01 | AAA | A1 | B1 | C1 | AA1 | 2020/1/20 | ... |
| ID02 | BBB | A2 | B2 | C2 | AA2 | 2020/1/20 | ... |
| ID03 | CCC | A3 | B3 | C3 | AA3 | 2020/1/20 | ... |
| ... | ... | ... | ... | ... | ... | ... | ... |

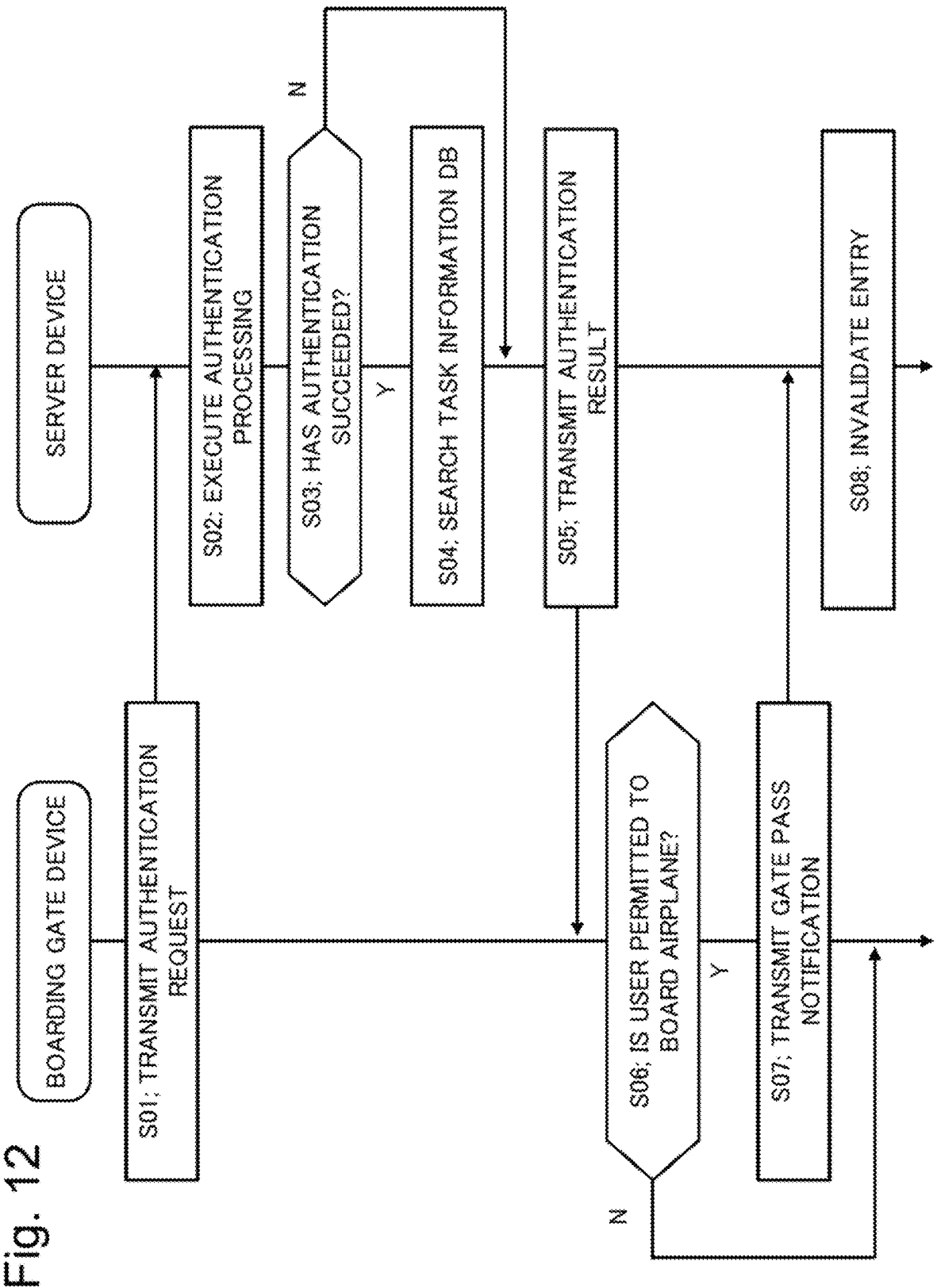

Fig. 13A

| TOKEN ID | FEATURE AMOUNT | INVALIDATION FLAG | SIMILARITY (Fa) |
|---|---|---|---|
| ID_A | Fv11 | 0 | 9 |
| ID_B | Fv12 | 0 | 6 |
| ID_C | Fv13 | 0 | 6 |
| ID_D | Fv14 | 0 | 5 |
| ID_E | Fv15 | 0 | 3 |

Fig. 13B

| TOKEN ID | FEATURE AMOUNT | INVALIDATION FLAG | SIMILARITY (Fb) |
|---|---|---|---|
| ID_A | Fv11 | 1 | |
| ID_B | Fv12 | 0 | 8 |
| ID_C | Fv13 | 0 | 9 |
| ID_D | Fv14 | 0 | 4 |
| ID_E | Fv15 | 0 | 3 |

ACCEPTANCE OF ANOTHER PERSON

Fig. 13C

| TOKEN ID | FEATURE AMOUNT | INVALIDATION FLAG | SIMILARITY (Fc) |
|---|---|---|---|
| ID_A | Fv11 | 1 | |
| ID_B | Fv12 | 0 | 6 |
| ID_C | Fv13 | 1 | |
| ID_D | Fv14 | 0 | 3 |
| ID_E | Fv15 | 0 | 4 |

USER C FAILS IN AUTHENTICATION

Fig. 14

| TOKEN ID | FEATURE AMOUNT | INVALIDATION FLAG | SIMILARITY (Fc) |
|---|---|---|---|
| ID_A | Fv11 | 1 | 5 |
| ID_B | Fv12 | 0 | 6 |
| ID_C | Fv13 | 1 | 9 |
| ID_D | Fv14 | 0 | 3 |
| ID_E | Fv15 | 0 | 4 |

SERVER DEVICE, SYSTEM, AND CONTROL METHOD FOR SERVER DEVICE

This application is a National Stage Entry of PCT/JP2020/025328 filed on Jun. 26, 2020, the contents of all of which are incorporated herein by reference, in their entirety.

TECHNICAL FIELD

The present invention relates to a server device, a system, a control method for a server device, and a recording medium.

BACKGROUND ART

PTL 1 discloses a ticketless boarding system that performs various procedures through face authentication using biometric information (a face image) about a passenger at a plurality of check points (a check-in lobby, a security check area, a boarding gate, etc.) in an airport.

PTL 2 discloses a face authentication system that opens and closes a gate through face authentication. PTL 2 describes that the present invention eliminates the need for ticketing and the like, and enables improvement in gate pass throughput.

CITATION LIST

Patent Literature

[PTL 1] JP 2007-079656 A
[PTL 2] WO 2018/181968 A1

SUMMARY OF INVENTION

Technical Problem

In each of the systems disclosed in PTL 1 and PTL 2, a user is authenticated by comparing biometric information registered in a storage unit (a database) with biometric information acquired from a terminal. Here, when the number of users registered in the database increases, the number of users having similar faces increases, resulting in a deterioration in accuracy of authentication. In particular, a gate device installed at an airport or the like for a passenger to board an airplane is a last check point in a series of boarding procedures, and thus, needs to perform authentication with high accuracy.

A main object of the present invention is to provide a server device, a system, a control method for a server device, and a recording medium that contribute to achieving highly accurate biometric authentication.

Solution to Problem

According to a first aspect of the present invention, there is provided a server device including: a management unit that manages a database storing biometric information about each of a plurality of users; and a processing unit that processes an authentication request from each of a plurality of terminals including a gate device at a last stage in a series of procedures with reference to the database, in which when a first user who has succeeded in authentication passes through the gate device, the management unit invalidates an entry of the first user stored in the database.

According to a second aspect of the present invention, there is provided a system including: a plurality of terminals including a gate device at a last stage in a series of procedures; and a server device connected to the plurality of terminals, the server device including: a management unit that manages a database storing biometric information about each of a plurality of users; and a processing unit that processes an authentication request from each of the plurality of terminals with reference to the database, in which when a first user who has succeeded in authentication passes through the gate device, the management unit invalidates an entry of the first user stored in the database.

According to a third aspect of the present invention, there is provided a control method for a server device including a database that stores biometric information about each of a plurality of users, the control method including: executing biometric authentication with reference to the database when receiving an authentication request from each of a plurality of terminals including a gate device at a last stage in a series of procedures; and invalidating an entry of a first user stored in the database when the first user who has succeeded in authentication passes through the gate device.

According to a fourth aspect of the present invention, there is provided a computer-readable recording medium storing a program for causing a computer mounted on a server device including a database that stores biometric information about each of a plurality of users to execute processing including: executing biometric authentication with reference to the database when receiving an authentication request from each of a plurality of terminals including a gate device at a last stage in a series of procedures; and invalidating an entry of a first user stored in the database when the first user who has succeeded in authentication passes through the gate device.

Advantageous Effects of Invention

According to the aspects of the present invention, there are provided a server device, a system, a control method for a server device, and a recording medium that contribute to achieving highly accurate biometric authentication. Note that the effect of the present invention is not limited thereto. The present invention may have other effects instead of or in addition to the above-described effect.

BRIEF DESCRIPTION OF DRAWINGS

FIG. 6 is a diagram illustrating an example of a token issue request according to the first example embodiment.

FIG. 10 is a diagram illustrating an example of a token ID information database according to the first example embodiment.

FIG. 11 is a diagram illustrating an example of a task information database according to the first example embodiment.

FIG. 12 is a sequence diagram illustrating an example of an operation of the boarding procedure system according to the first example embodiment.

FIG. 13A is a diagram illustrating an example of a token ID information database according to a second example embodiment.

FIG. 13B is a diagram illustrating an example of a token ID information database according to the second example embodiment.

FIG. 13C is a diagram illustrating an example of a token ID information database according to the second example embodiment.

FIG. 14 is a diagram illustrating an example of a token ID information database according to the second example embodiment.

EXAMPLE EMBODIMENT

Figure 1:
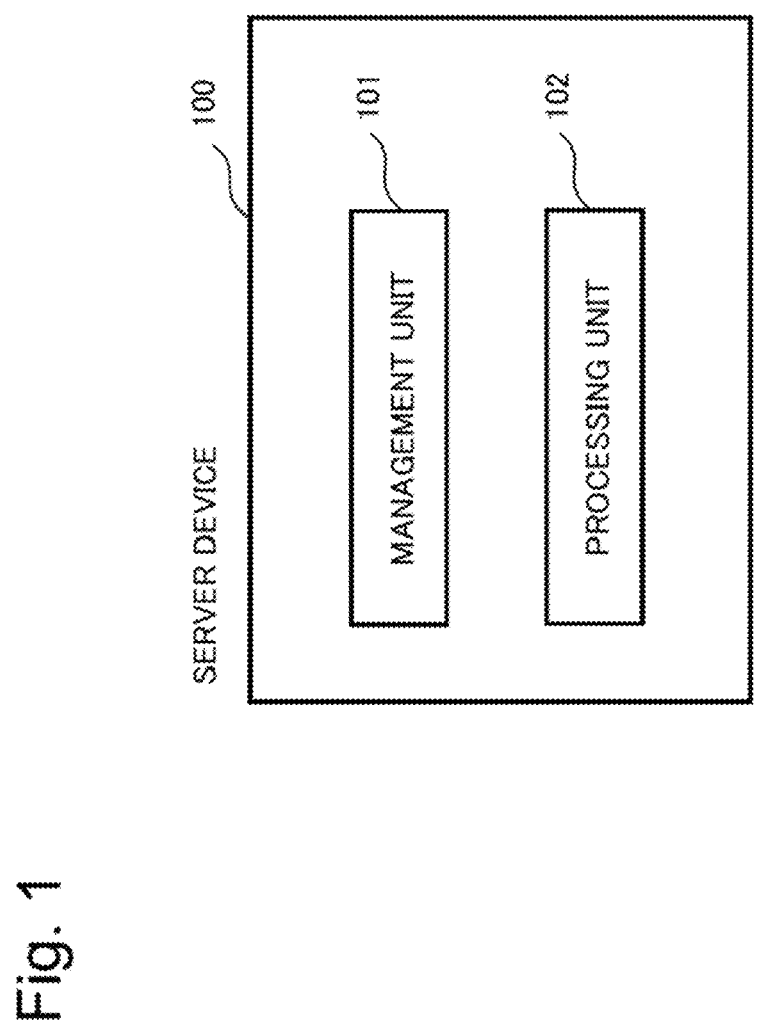
FIG. 1 is a diagram for explaining an outline of an example embodiment.

First, an outline of an example embodiment will be described. Note that the reference signs used in the drawings are attached to the respective elements in this outline for convenience as an example for assisting understanding, and the description of this outline is not intended to make a limitation. In addition, unless particularly explained, a block illustrated in each drawing represents a functional unit rather than a hardware unit. A connection line between blocks in each drawing refers to both a bidirectional line and a unidirectional line. A unidirectional arrow schematically indicates a main flow of a signal (data), and does not exclude bidirectionality. Note that, in the present specification and the drawings, elements that can be similarly described are denoted by the same reference signs, so that redundant description can be omitted.

A server device 100 according to an example embodiment includes a management unit 101 and a processing unit 102 (see FIG. 1). The management unit 101 manages a database that stores biometric information about each of a plurality of users. The processing unit 102 processes an authentication request from each of a plurality of terminals, including a gate device at a last stage of a series of procedures, with reference to the database. When a first user who has succeeded in authentication passes through the gate device, the management unit 101 invalidates an entry of the first user stored in the database.

The server device 100 invalidates the entry of the user who has passed through the last gate device. As a result, the number of entries to be subjected to biometric authentication by the server device 100 is reduced, and accuracy of biometric authentication is improved.

Hereinafter, specific example embodiments will be described in more detail with reference to the drawings.

First Example Embodiment

A first example embodiment will be described in more detail with reference to the drawings.
[Configuration of System]

Figure 2:
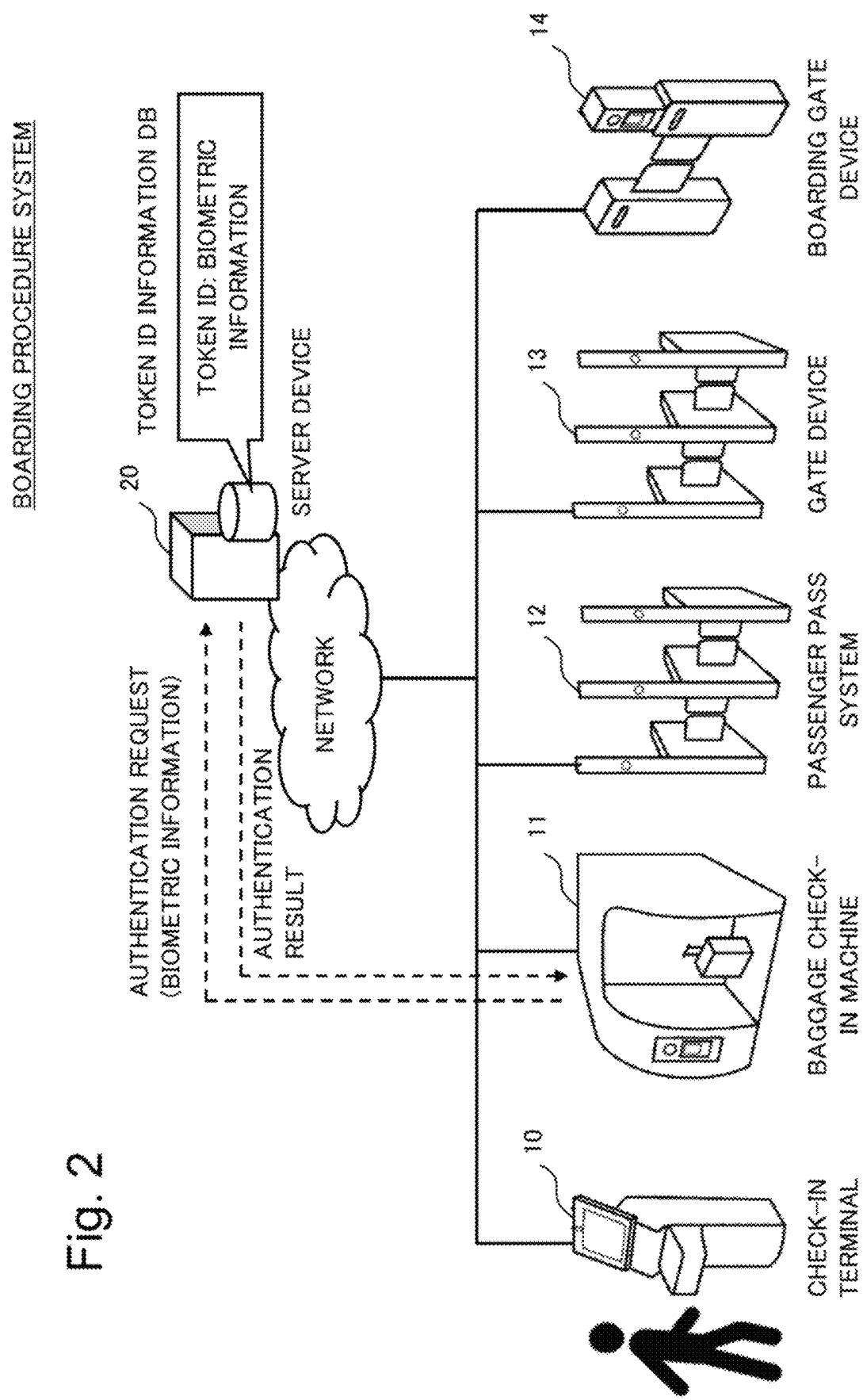
FIG. 2 is a diagram illustrating an example of a schematic configuration of a boarding procedure system according to a first example embodiment.

FIG. 2 is a diagram illustrating an example of a schematic configuration of a boarding procedure system according to a first example embodiment. The boarding procedure system according to the first example embodiment is a system that achieves a series of procedures (checking of baggage, security check, etc.) at an airport with biometric authentication. The boarding procedure system illustrated in FIG. 2 is operated by, for example, a public institution such as and an immigration/emigration control bureau or a contractor entrusted with tasks by the public institution.

Note that, in the present disclosure, the "boarding procedures" indicate a series of procedures performed from checking in to boarding on an airplane.

Referring to FIG. 2, the boarding procedure system includes a check-in terminal 10, a baggage check-in machine 11, a passenger pass system 12, a gate device 13, a boarding gate device 14, and a server device 20.

The check-in terminal 10, the baggage check-in machine 11, the passenger pass system 12, the gate device 13, and the boarding gate device 14 are terminals (touch points) installed at the airport. These terminals are connected to the server device 20 via a network. The network illustrated in FIG. 2 includes a local area network (LAN) including an airport private communication network, a wide area network (WAN), a mobile communication network, and the like. The connection method is not limited to the wired method, and may be a wireless method.

The server device 20 is installed in a facility of an airport company or the like. Alternatively, the server device 20 may be a server installed in a cloud on the network.

Note that the configuration illustrated in FIG. 2 is exemplary, and is not intended to limit the configuration of the boarding procedure system. The boarding procedure system may include a terminal that is not illustrated or the like.

The boarding procedures of the user are performed by the terminals illustrated in FIG. 2. Specifically, when a user leaves a country, a series of procedures are sequentially performed by the terminals installed at the five places. In the boarding procedure system illustrated in FIG. 2, the boarding procedures of the user are achieved by authentication (biometric authentication) using biometric information.

In the present disclosure, the biometric information is a face image, a fingerprint image, an iris image, a finger vein image, a palm print image, a palm vein image, or the like. The biometric information may be one piece of biometric information or a plurality of pieces of biometric information. Note that the term "biometric information" in the present disclosure refers to an image including all or some of a living body and a feature amount extracted from the image.

When arriving at the airport, a user (a system user) who wants to take boarding procedures through biometric authentication operates the check-in terminal 10 to perform a "check-in procedure". The system user presents a paper airline ticket, a two-dimensional barcode expressing boarding information, a mobile terminal displaying a copy of an e-ticket, or the like to the check-in terminal 10. Upon completing the check-in procedure, the check-in terminal 10 outputs a boarding pass. The boarding pass includes a paper-medium boarding pass or an electronic-medium boarding pass.

The system user who has completed the check-in procedure and wants to take boarding procedures through biometric authentication performs system registration using the check-in terminal 10. Specifically, the system user causes the check-in terminal 10 to read the acquired boarding pass and a passport. Furthermore, the check-in terminal 10 acquires biometric information (e.g., a face image) about the system user.

The check-in terminal 10 transmits the information regarding the boarding pass, the passport, and the biometric information to the server device 20.

The server device 20 confirms the validity of the information acquired from the check-in terminal 10. Specifically, the server device 20 confirms the validity of the presented passport. Upon completing the confirmation, the server device 20 registers the system user. Specifically, the server device 20 issues a token to be used for the boarding procedures of the user registered in the system.

The issued token is identified by a token identifier (ID). Information necessary for the boarding procedures (e.g., biometric information and information on tasks necessary for the boarding procedures) is associated with the token ID. That is, the "token" is issued concurrently with the registration of the system user, and is identification information for the registered system user to take the boarding procedures using the biometric information. When the token (the token ID) is issued, the system user can use the boarding procedures using the biometric authentication.

As the token is generated, the server device 20 adds an entry to each of a token ID information database and a task information database.

The token ID information database is a database that stores detailed information about the generated token. The token ID information database stores at least the token ID and the biometric information (the face image or the feature amount) in association with each other. The server device 20 performs biometric authentication with reference to the token ID information database.

The task information database is a database that stores task information. The task information database stores the token ID and the task information in association with each other.

When a system user for which a token is issued arrives at a terminal (a touch point, e.g., the baggage check-in machine 11), the terminal acquires biometric information (e.g., a face image). The terminal transmits an authentication request including the face image to the server device 20.

The server device 20 specifies a token ID through collation processing (one-to-N collation; N is a positive integer, and the same applies hereinafter) using the biometric information acquired from the terminal and the biometric information registered in the system. The server device 20 transmits an authentication result including the specified token ID and task information to the terminal. The boarding procedures of the user are performed based on the task information.

When the series of boarding procedures are completed and the user leaves the country (when the user passes through the boarding gate device 14), the token ID is invalidated. Specifically, the server device 20 invalidates an entry of the token ID associated to the user who has passed through the boarding gate device 14.

The invalidated entry is not referred to in authentication processing (one-to-N collation processing) that occurs thereafter. That is, the server device 20 performs collation processing with respect to valid entries which are not invalidated among entries in the token ID information database.

The check-in terminal 10 is installed at a check-in lobby in the airport. As described above, a user performs system registration for achieving boarding procedures based on biometric authentication using the check-in terminal 10. Furthermore, the system user performs a check-in procedure by operating the check-in terminal 10. That is, the check-in terminal 10 is also a self-terminal for a user to operate in person to perform a check-in procedure. The check-in terminal 10 is also referred to as a common use self service (CUSS) terminal. Upon completing the check-in procedure, the user moves to a baggage check-in area or a security check area.

The baggage check-in machine 11 is installed in an area close to a baggage counter (a manned counter) or an area near the check-in terminal 10 in the airport. The baggage check-in machine 11 is a self-terminal for a user to operate in person to perform a procedure for checking in baggage that is not carried into an airplane (a baggage check-in procedure). The baggage check-in machine 11 is also referred to as a common use bag drop (CUBD) terminal. Upon completing the baggage check-in procedure, the user moves to the security check area. In a case where the user does not check in baggage, the baggage check-in procedure is omitted.

The passenger pass system 12 is a gate device installed at an entrance of the security check area in the airport. The passenger pass system 12 is also referred to as a passenger reconciliation system (PRS), and is a system that determines whether to permit the user to pass at the entrance of the security check area. Upon completing the security check procedure after passing through the passenger pass system 12, the user moves to a departure inspection area.

The gate device 13 is installed at the departure inspection area in the airport. The gate device 13 is a device that automatically performs a departure inspection procedure of the user. Upon completing the departure inspection procedure, the user moves to a departure area where duty-free shops and boarding gates are provided.

The boarding gate device 14 is a pass control device installed for each boarding gate in the departure area.

The boarding gate device 14 is a last stage gate device in a series of procedures of departure inspection (inspection using biometric information). The boarding gate device 14 is also referred to as an automated boarding gates (ABG) terminal. The boarding gate device 14 confirms that the user is a passenger of an airplane that can be boarded from a boarding gate. Upon passing through the boarding gate device 14, the user boards the airplane and leaves for a second country.

Note that the boarding procedures using biometric authentication through the devices (the check-in terminal 10, the baggage check-in machine 11, the passenger pass system 12, the gate device 13, and the boarding gate device 14) illustrated in FIG. 2 are exemplary, and are not intended to limit the devices used for the procedures. For example, devices different from the above-described devices may be used for the boarding procedure, or some of the above-described devices may not be used for the procedures. For example, the gate device 13 may not be included in the boarding procedure system.

The server device 20 is a server device for supporting and managing the boarding procedures. The server device 20 manages token IDs. Specifically, the server device 20 issues or invalidates a token ID. In addition, the server device 20 processes authentication requests from various terminals in the airport.

Next, details of each of the devices included in the boarding procedure system according to the first example embodiment will be described. In the following description, a "face image" of a user will be used as an example of biometric information.

[Check-In Terminal]

As described above, the check-in terminal 10 is a device that provides a system user with operations related to the check-in procedure and the system registration.

Figure 3:
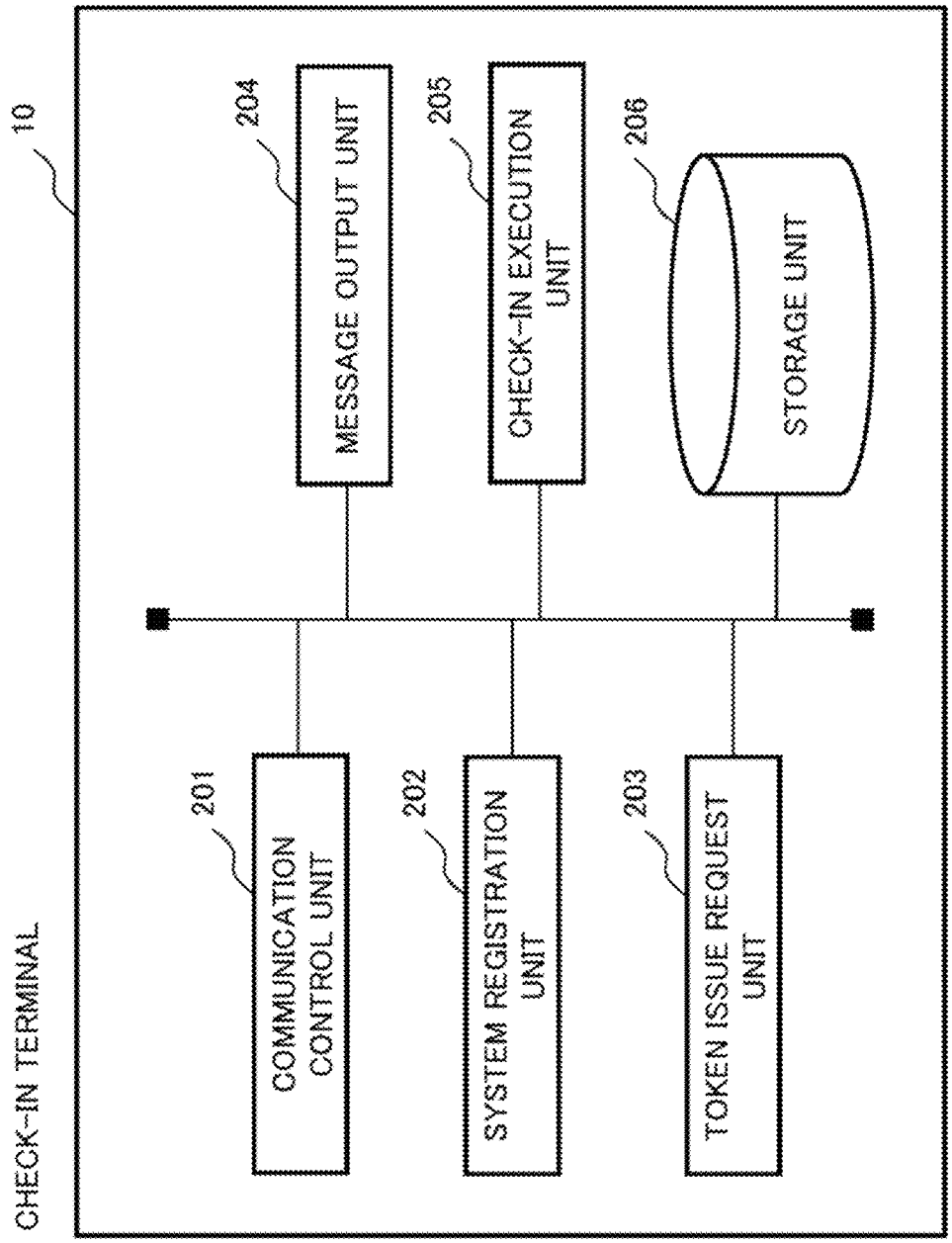
FIG. 3 is a diagram illustrating an example of a processing configuration of a check-in terminal according to the first example embodiment.

FIG. 3 is a diagram illustrating an example of a processing configuration (processing modules) of the check-in terminal 10 according to the first example embodiment. Referring to FIG. 3, the check-in terminal 10 includes a communication control unit 201, a system registration unit 202, a token issue request unit 203, a message output unit 204, a check-in execution unit 205, and a storage unit 206.

The communication control unit 201 is a means for controlling communication with another device. For example, the communication control unit 201 receives data (packet) from the server device 20. Also, the communication control unit 201 transmits data to the server device 20. The communication control unit 201 delivers data received from another device to another processing module. The communication control unit 201 transmits data acquired from another processing module to another device. In this way, another processing module transmits and receives data to and from another device via the communication control unit 201.

Figure 4:
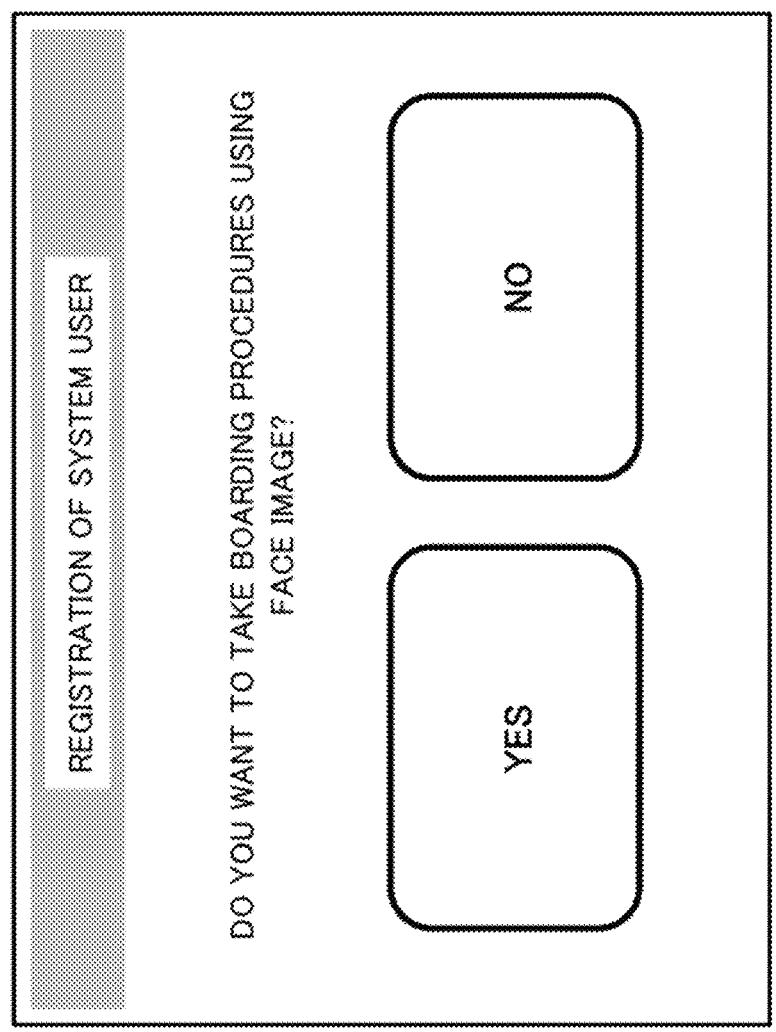
FIG. 4 is a diagram for explaining an operation of a system registration unit according to the first example embodiment.

The system registration unit 202 is a means for registering, in a system, a user who wants to take boarding procedures through biometric authentication. For example, after the check-in procedure is completed, the system registration unit 202 provides the user with a graphical user interface (GUI) for confirming whether the user desires "boarding procedures using a face image" (see FIG. 4).

When the user wants to take boarding procedures using a face image, the system registration unit 202 acquires three pieces of information (information described in a boarding pass, information described in a passport, and biometric information) using a GUI for acquiring the three pieces of information.

Figure 5:
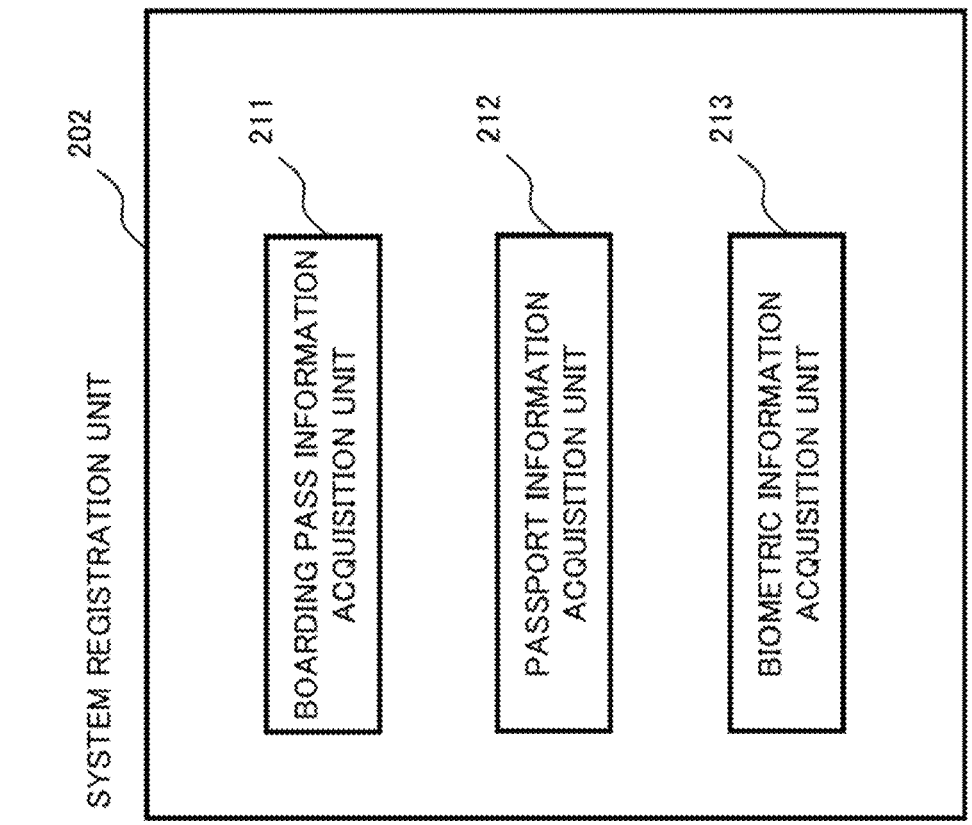
FIG. 5 is a diagram illustrating an example of a processing configuration of the system registration unit according to the first example embodiment.

The system registration unit 202 includes three submodules. FIG. 5 is a diagram illustrating an example of a processing configuration (processing modules) of the system registration unit 202 according to the first example embodiment. As illustrated in FIG. 5, the system registration unit 202 includes a boarding pass information acquisition unit 211, a passport information acquisition unit 212, and a biometric information acquisition unit 213.

The boarding pass information acquisition unit 211 is a means for acquiring information described in a boarding pass possessed by a system user (hereinafter referred to as boarding pass information). The boarding pass information acquisition unit 211 acquires the boarding pass information by controlling a reader (not illustrated) such as a scanner.

The boarding pass information includes a name (a family name and a first name), an airline code, a flight number, a boarding date, a departure place (a boarding airport), a destination (an arrival airport), a seat number, a boarding time, an arrival time, etc.

The passport information acquisition unit 212 is a means for acquiring information described in a passport possessed by a system user (hereinafter referred to as passport information). The passport information acquisition unit 212 acquires the passport information by controlling a reader such as a scanner.

The passport information includes a face image (hereinafter referred to as a passport face image), a name, a sex, a nationality, a passport number, a passport issuing country, etc.

The biometric information acquisition unit 213 is a means for acquiring biometric information about a system user. The biometric information acquisition unit 213 acquires a face image of the system user by controlling a camera. For example, when detecting a face in an image that is constantly or periodically captured, the biometric information acquisition unit 213 captures a face of the user to acquire a face image.

It is preferable that the biometric information acquisition unit 213 display a guidance message regarding capturing a face image via the message output unit 204 before capturing the face image. For example, the biometric information acquisition unit 213 displays a message such as "Your face image will be captured and registered in the system. The registered face image will be deleted from the system after boarding is completed.".

The system registration unit 202 delivers the acquired three pieces of information (the boarding pass information, the passport information, and the biometric information) to the token issue request unit 203.

The token issue request unit 203 illustrated in FIG. 3 is a means for requesting the server device 20 to issue a token. The token issue request unit 203 generates a token issue request including the boarding pass information, the passport information, and the biometric information (the face image). For example, the token issue request unit 203 generates a token issue request including an identifier of the check-in terminal (hereinafter referred to as a check-in terminal identifier), the boarding pass information, etc. (see FIG. 6). As the check-in terminal identifier, a media access control (MAC) address or an Internet protocol (IP) address of the check-in terminal 10 can be used. The token issue request unit 203 transmits the generated token issue request to the server device 20.

The token issue request unit 203 delivers a response (a response to the token issue request) acquired from the server device 20 to the message output unit 204.

The message output unit 204 is a means for outputting various messages. For example, the message output unit 204 outputs a message appropriate for the response acquired from the server device 20.

In a case where a response (a positive response) indicating that the token has been successfully issued is received, the message output unit 204 outputs the fact. For example, the message output unit 204 outputs a message such as "The future procedures can be performed through face authentication".

In a case where a response (a negative response) indicating that the issue of the token has failed is received, the message output unit 204 outputs the fact. For example, the message output unit 204 outputs a message such as "Sorry. Procedures cannot be performed through face authentication. Please go to a manned booth.".

The check-in execution unit 205 is a means for performing a check-in procedure of the user. The check-in execution unit 205 executes a check-in procedure such as selecting a seat based on an airline ticket presented by the user. For example, the check-in execution unit 205 transmits information described in the airline ticket to a departure control system (DCS), and acquires information to be described in a boarding pass from the DCS. Note that the operation of the check-in execution unit 205 can be same as the operation of the conventional check-in terminal, and thus, the more detailed description thereof will be omitted.

The storage unit 206 is a means for storing information required for operating the check-in terminal 10.

[Boarding Gate Device]

Figure 7:
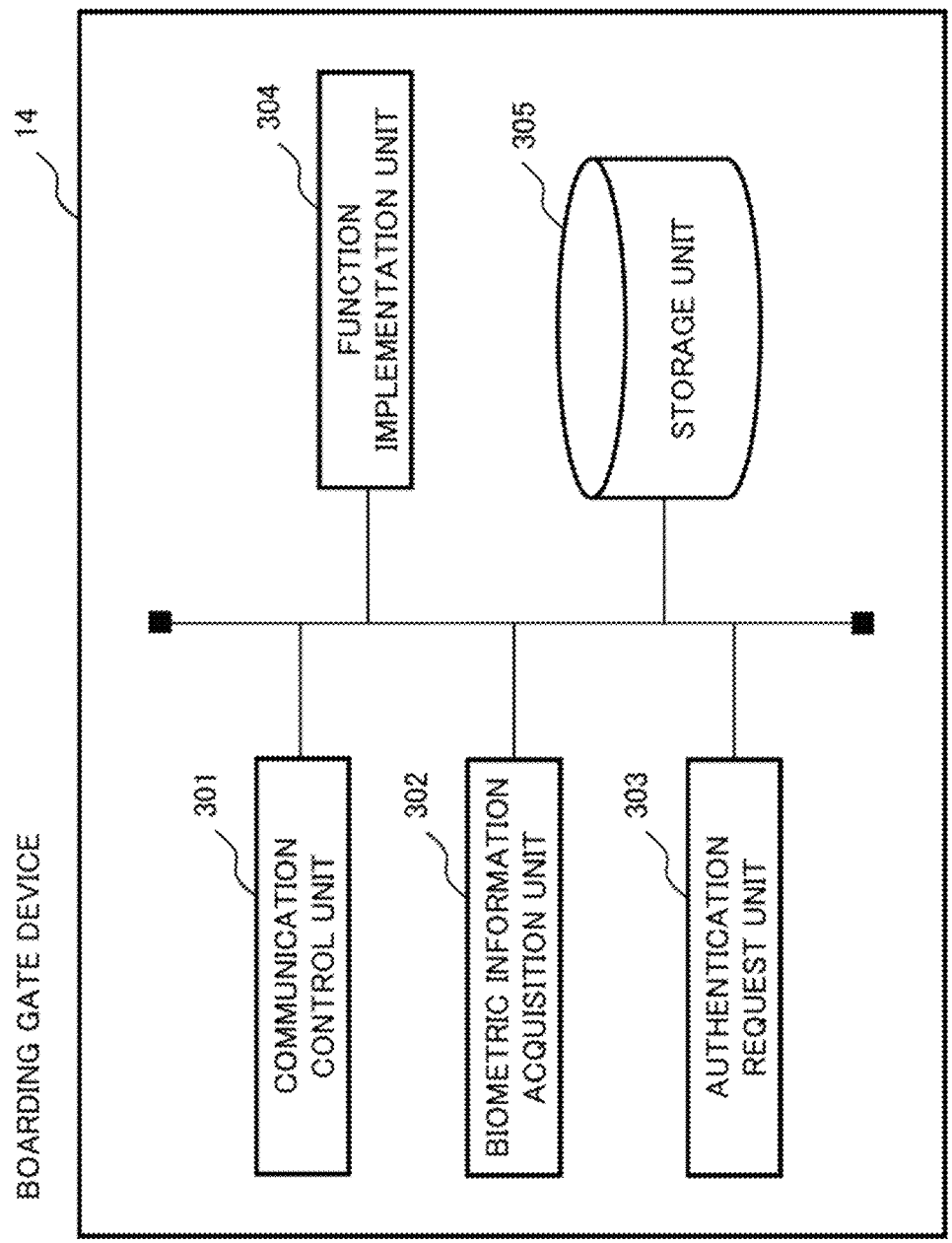
FIG. 7 is a diagram illustrating an example of a processing configuration of a boarding gate device according to the first example embodiment.

FIG. 7 is a diagram illustrating an example of a processing configuration (processing modules) of the boarding gate device 14 according to the first example embodiment. Referring to FIG. 7, the boarding gate device 14 includes a communication control unit 301, a biometric information acquisition unit 302, an authentication request unit 303, a function implementation unit 304, and a storage unit 305.

The communication control unit 301 is a means for controlling communication with another device. For example, the communication control unit 301 receives data (packet) from the server device 20. Also, the communication control unit 301 transmits data to the server device 20. The communication control unit 301 delivers data received from another device to another processing module. The communication control unit 301 transmits data acquired from another processing module to another device. In this way, another processing module transmits and receives data to and from another device via the communication control unit 301.

The biometric information acquisition unit 302 is a means for acquiring biometric information about a user by controlling a camera (not illustrated). The biometric information acquisition unit 302 captures an image in front of the boarding gate device periodically or at a predetermined timing. The biometric information acquisition unit 302 determines whether a face image of a person is included in the acquired image, and extracts the face image from the acquired image data when the face image is included.

Concerning a process of detecting or extracting a face image by the biometric information acquisition unit 302, a conventional technique can be used, and thus, the detailed description thereof will be omitted. For example, the biometric information acquisition unit 302 may extract a face image (a face area) from the image data using a learning model trained by a convolutional neural network (CNN). Alternatively, the biometric information acquisition unit 302 may extract a face image using a template matching method or the like.

The biometric information acquisition unit 302 delivers the extracted face image to the authentication request unit 303.

Figure 8:
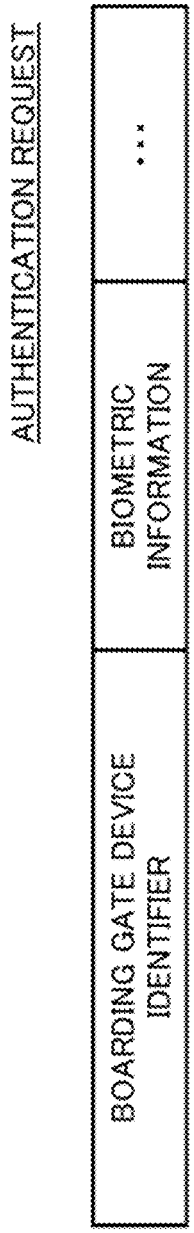
FIG. 8 is a diagram illustrating an example of an authentication request according to the first example embodiment.

The authentication request unit 303 is a means for requesting the server device 20 to authenticate a user in front of the boarding gate device. The authentication request unit 303 generates an authentication request including an identifier of the boarding gate device (hereinafter referred to as a boarding gate device identifier), the acquired face image, etc. (see FIG. 8). An IP address or the like can be used as the boarding gate device identifier. The authentication request unit 303 transmits the generated authentication request to the server device 20.

The authentication request unit 303 receives a response to the authentication request from the server device 20.

When the authentication result is "authentication has failed", the authentication request unit 303 notifies the visitor of the fact.

When the authentication result is "authentication has succeeded", the authentication request unit 303 notifies the function implementation unit 304 of the fact. In addition, the authentication request unit 303 delivers the token ID and the task information acquired from the server device 20 to the function implementation unit 304.

The function implementation unit 304 is means for implementing a function of the boarding gate device 14. The function implementation unit 304 specifies a flight number of an airplane that can be boarded by a user (a person who has succeeded in authentication) from the acquired task information. The function implementation unit 304 permits the person who has succeeded in authentication to pass through a gate when the specified flight number matches a flight number assigned to the boarding gate device. Note that the operation of the function implementation unit 304 can be the same as the operation of the conventional boarding gate device, and thus, the detailed description thereof will be omitted. In addition, an employee working for an airline of the airplane boarded from the boarding gate device 14 may assign (input) a necessary flight number to the boarding gate device 14.

In a case where the person who has succeeded in authentication is permitted to pass through the gate, the function implementation unit 304 notifies the server device 20 of the fact. Specifically, the function implementation unit 304 transmits a "gate pass notification" including a token ID of the user who has passed through the gate to the server device 20.

The storage unit 305 is a means for storing information required for operating the boarding gate device 14.

[Other Terminals]

A basic processing configuration of each of the other terminals (the baggage check-in machine 11, the passenger pass system 12, and the gate device 13) included in the boarding procedure system can be the same as the processing configuration of the boarding gate device 14 illustrated in FIG. 7, and thus, the detailed description thereof will be omitted. Each of the terminals acquires biometric information (a face image) about a system user, and requests the server device 20 to perform authentication using the acquired biometric information. When authentication has succeeded, the function allocated to each of the terminals is executed. The gate device 13 or the like may or may not transmit information corresponding to the gate pass notification to server device 20.

[Server Device]

Figure 9:
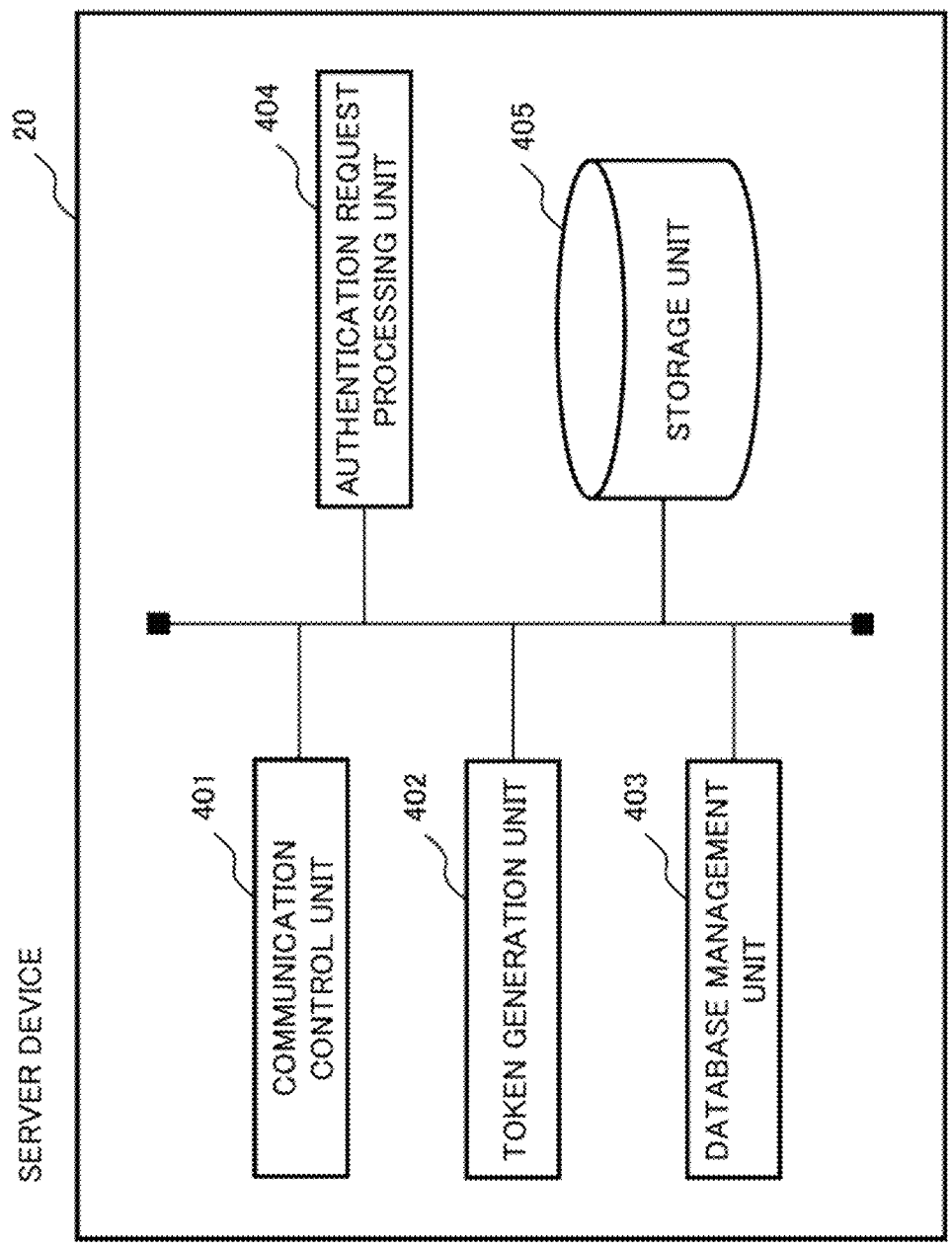
FIG. 9 is a diagram illustrating an example of a processing configuration of a server device according to the first example embodiment.

FIG. 9 is a diagram illustrating an example of a processing configuration (processing modules) of the server device 20 according to the first example embodiment. Referring to FIG. 9, the server device 20 includes a communication control unit 401, a token generation unit 402, a database management unit 403, an authentication request processing unit 404, and a storage unit 405.

The communication control unit 401 is a means for controlling communication with another device. For example, the communication control unit 401 receives data (packet) from the check-in terminal 10. Also, the communication control unit 401 transmits data to the check-in terminal 10. The communication control unit 401 delivers data received from another device to another processing module. The communication control unit 401 transmits data acquired from another processing module to another device. In this manner, another processing module transmits and receives data to and from another device via the communication control unit 401.

The token generation unit 402 is a means for generating a token in response to a token generation request from the check-in terminal 10. At that time, the token generation unit 402 determines whether a passport presented by a user is valid.

Specifically, the token generation unit 402 determines whether a person who presents a passport to the check-in terminal 10 is the same as a person for which the passport has been issued. In order to make determination, the token generation unit 402 extracts a face image (a face image of the system user) included in the token generation request and a passport face image included in the passport information. The token generation unit 402 determines whether the two face images substantially match each other.

The token generation unit 402 executes collation (one-to-one collation) between the two face images. The token generation unit 402 calculates a feature vector from each of the two images. The token generating unit 402 calculates similarity (e.g., a Euclidean distance) between the two images, and determines whether the two images are face images of the same person based on a result of threshold value processing on the calculated similarity. For example, when the similarity is larger than a predetermined value (in a case where the distance is shorter than a predetermined value), the token generation unit 402 determines that the two face images are of the same person.

When it is successfully determined using the biometric information that the passport is valid, the token generation unit 402 issues a token. For example, the token generation unit 402 generates a unique value as a token ID based on a date and time at the time of processing, a sequence number, or the like.

When the token generation unit 402 has generated a token (a token ID), the token generation unit 402 transmits a positive response (a token has been issued) to the check-in terminal 10. When the token generation unit 402 has failed to generate a token ID, the token generation unit 402 transmits a negative response (a token has not been issued) to the check-in terminal 10.

When a token ID has been successfully generated (issued), the token generation unit 402 delivers the generated token ID, the boarding pass information, the passport information, and the face image (the face image of the system user) to the database management unit 403.

The database management unit 403 is a means (management unit) for managing various databases constructed in the server device 20.

The server device 20 includes a token ID information database and a task information database.

The token ID information database stores at least a token ID and biometric information about a user in association with each other. FIG. 10 is a diagram illustrating an example of a token ID information database. Referring to FIG. 10, the token ID information database has fields for storing a token ID, a registered face image, a feature amount, a token issue time, a token issue device name, an invalidation flag, an invalidation time, etc.

As described above, the token ID is an identifier that is temporarily issued. When the user finishes the procedure performed by the boarding gate device 14, the token ID is invalidated. That is, the token ID is not an identifier that is permanently used, but is a one-time ID having an expiration period (a life cycle).

The registered face image is a face image of a system user. For example, the registered face image may be a face image of a user captured by the check-in terminal 10, or may be a passport face image. The feature amount is a feature vector generated from the face image. The token issue time is a time when the server device 20 issues the token ID. The device name is a device name (the check-in terminal 10) from which the registered face image causing the issue of the token ID is acquired.

The invalidation flag is flag information indicating whether the token ID is valid at a current time point. The invalidation flag is cleared to "0" when the token ID is valid, and is set to "1" when the token ID is invalid. The invalidation time is a time stamp when the token ID is invalidated.

The task information database is a database that manages information (task information) necessary for boarding procedures of users. FIG. 11 is a diagram illustrating an example of a task information database. Referring to FIG. 11, the task information database has fields for storing a token ID, a passenger name, a departure place, a destination, an airline code, a flight number, an operation date, etc. In addition to the above-described fields, the task information database may include fields for storing a seat number, a nationality, a passport number, a family name, a first name, a date of birth, a gender, etc. The task information database stores task information related to a predetermined task (a procedure task performed at each touch point) for each token ID.

The information stored in the task information database is acquired from the boarding pass information and the passport information.

When acquiring a token ID from the token generation unit 402 (when a token ID is issued), the database management unit 403 adds a new entry to the two databases. The database management unit 403 sets setting values in the fields for each database. For example, the database management unit 403 generates a feature amount from the registered face image and registers the generated feature amount in the token ID information database. The database management unit 403 may set initial values (default values) in fields for which setting values cannot be set.

When receiving a gate pass notification from the boarding gate device 14, the database management unit 403 extracts a token ID included in the notification. The database management unit 403 searches the token ID information database using the extracted token ID as a key, and specifies an entry associated thereto. The database management unit 403 sets "1" in the invalidation flag field of the specified entry to invalidate the entry. The database management unit 403 sets a time when the entry is invalidated in the invalidation time field. In the example of FIG. 10, an entry having "ID02" in the second row is invalidated.

In the task information database, similarly to the token ID information database, an entry of a user who has passed through the boarding gate device 14 may be invalidated or may not be invalidated. This is because, in the authentication processing (collation processing) of the server device 20, the token ID information database is referred to first among the databases, and the state (whether an entry is valid or invalid) of the task information database is irrelevant to the authentication processing.

As described above, the database management unit 403 manages the database (the token ID information database) that stores biometric information for each of the plurality of users. When a user (a first user) who has succeeded in authentication passes through the boarding gate device 14, the database management unit 403 invalidates an entry of the user stored in the token ID information database. More specifically, when receiving, from the boarding gate device 14, a gate pass notification indicating that a person who has succeeded in authentication has passed through the boarding gate device 14, the database management unit 403 invalidates an entry associated thereto. That is, the database management unit 403 recognizes that a user has passed through the boarding gate device 14 by receiving a gate pass notification from the boarding gate device 14. Thereafter, the database management unit 403 invalidates an entry associated to the user who has passed through the boarding gate device 14.

The authentication request processing unit 404 is a means (processing unit) for processing an authentication request acquired from a terminal. The authentication request processing unit 404 processes an authentication request from each of the plurality of terminals, including the boarding gate device 14 at the last stage in the series of procedures, with reference to the token ID information database. The authentication request includes biometric information about a person to be authenticated. The authentication request processing unit 404 executes collation processing (one-to-N collation) using the biometric information included in the authentication request and the biometric information included in the token ID information database.

The authentication request processing unit 404 generates a feature amount from a face image acquired from the terminal. The authentication request processing unit 404 extracts feature points from the face image. Concerning a process of extracting feature points, a conventional technique can be used, and thus, the detailed description thereof will be omitted. For example, the authentication request processing unit 404 extracts eyes, a nose, a mouth, and the like as feature points from the face image. Thereafter, the authentication request processing unit 404 calculates a position of each of the feature points or a distance between the feature points as a feature amount, and generates a feature vector including a plurality of feature amounts.

The authentication request processing unit 404 sets the generated feature amount (the feature vector) as a feature amount on the collation side, and sets a valid feature amount (a feature amount of an entry which is not invalidated) registered in the token ID information database as a feature amount on the registration side. In the example of FIG. 10, the feature amounts included in the entries of the first and third rows for which "0" is set as an invalidation flag are selected as feature amounts on the registration side.

The authentication request processing unit 404 calculates a similarity between the feature amount on the collation side and each of the plurality of feature amounts on the registration side. The similarity can be calculated using a Chi-square distance, a Euclidean distance, or the like. The similarity is lower as the distance is longer, and the similarity is higher as the distance is shorter.

When there is a feature amount having a similarity greater than or equal to a predetermined value to the feature amount on the collation side among the plurality of feature amounts (valid feature amounts) registered in the token ID information database, the authentication request processing unit 404 determines that authentication has succeeded.

When the authentication has succeeded, the authentication request processing unit 404 specifies a token ID associated to the feature amount having the highest similarity. The authentication request processing unit 404 searches the task information database using the specified token ID as a key, and specifies an entry associated thereto.

The authentication request processing unit 404 transmits an authentication result to the terminal (responds to the authentication request). When the authentication has succeeded, the authentication request processing unit 404 transmits, to the terminal, a response including the fact (the authentication has succeeded) and the entry (the token ID and the task information) specified from the task information database. When the authentication has failed, the authentication request processing unit 404 transmits a response including the fact (the authentication has failed) to the terminal.

The storage unit 405 is a means for storing various types of information required for operating the server device 20. In the storage unit 405, the token ID information database and the task information database are constructed.

[Operation of System]

Next, an operation of the boarding procedure system according to the first example embodiment will be described. FIG. 12 is a sequence diagram illustrating an example of the operation of the boarding procedure system according to the first example embodiment. An operation for executing authentication processing on a user will be described with reference to FIG. 12. The description of the operation related to system registration will be omitted.

The boarding gate device 14 acquires a face image of a user (a person to be authenticated), and transmits an authentication request to the server device 20 (step S01).

The server device 20 generates a feature amount from the face image included in the authentication request, and executes authentication processing using the token ID information database (step S02). At that time, the server device 20 sets, on the registration side, a feature amount (a valid feature amount) of each of the entries for which "0" is set in the invalidation flag field among the feature amounts stored in the token ID information database.

When the authentication has succeeded (Yes in step S03), the server device 20 searches the task information database using a token ID obtained through the collation processing as a key (step S04).

When the authentication has failed (No in step S03), the server device 20 executes processing of step S05 and the subsequent steps.

The server device 20 transmits an authentication result (the authentication has succeeded or the authentication has failed) to the boarding gate device 14 (step S05). When the authentication has succeeded, the server device 20 transmits a response including details (a token ID and task information) of an entry specified by the search in step S04 to the boarding gate device 14.

The boarding gate device 14 that has received the authentication result performs processing according to the details. When receiving the authentication result indicating the authentication has succeeded, the boarding gate device 14 determines whether the user (the person who has succeeded in authentication) is qualified to board the airplane (step S06). Specifically, the boarding gate device 14 determines whether a flight number assigned to itself matches a flight number included in the task information.

When the boarding gate device 14 transmits the authentication request to the server device 20, the flight number assigned to the boarding gate device 14 may be included in the authentication request. The server device 20 may determine whether the user is permitted to board the airplane using the flight number extracted from the authentication request. That is, the collation using the flight number may be performed by the server device 20 rather than the boarding gate device 14.

If it is determined that the user is permitted to board the airplane (Yes in step S06), the boarding gate device 14 transmits a gate pass notification to the server device 20 (step S07).

When it is determined that the user is not permitted board the airplane (No in step S06), the boarding gate device 14 does not perform any operation with respect to the server device 20.

The server device 20 that has received the gate pass notification invalidates the entry for the token ID included in the notification (step S08). The server device 20 invalidates the entry (the token ID) for the user who has passed through the boarding gate device 14 by setting "1" in the invalidation flag field of the token ID information database.

The token ID information database includes an invalidation flag field indicating whether an entry for each of the plurality of users is invalid. Once receiving the gate pass notification from the boarding gate device 14, the database management unit 403 of the server device 20 sets a value "1" indicating that the entry is invalid in the invalidation flag field associated to the user who has passed through the boarding gate device 14.

As described above, in the first example embodiment, the entry (the token ID) for the user who has passed through the boarding gate device 14 at the last stage in the series of procedures is invalidated. As a result, the number of entries to be subjected to authentication processing by the server device 20 is reduced, thereby improving accuracy of biometric authentication using the face image or the feature amount generated from the face image. That is, the boarding procedure system according to the first example embodiment invalidates an entry that is not referred to after the last biometric authentication because the last procedure is terminated among the series of biometric authentication procedures. As a result, an amount of data in the database that stores the biometric authentication is reduced, making it possible to ensure sufficient accuracy of authentication. In addition, the number of entries to be searched for is reduced, and accordingly, a biometric authentication processing speed is also improved.

Second Example Embodiment

Next, a second example embodiment will be described in detail with reference to the drawings.

In the first example embodiment, an entry of the token ID information database is invalidated for a user who has passed through the boarding gate device 14, thereby reducing a data amount of the database. However, the countermeasure according to the first example embodiment may cause a problem that a user who has a valid qualification fails in authentication due to erroneous authentication related to "acceptance of another person". For example, in a case where there are persons having similar faces among the users registered in the token ID information database, the aforementioned problem is highly likely to occur.

For example, as illustrated in FIGS. 13A to 13C, it is assumed that information about five users A to E is registered in the token ID information database. In the drawings including FIGS. 13A to 13C, token IDs generated from the users A to E are ID_A to ID_E, respectively. In addition, for easy understanding, in the token ID information database illustrated in the drawings including FIGS. 13A to 13C, some fields are omitted, and a field for describing a similarity between a feature amount on the collation side and a feature amount on the registration side is added. The parenthesis in the field for the similarity indicates a feature amount on the collation side.

When a user A arrives at the boarding gate device 14, a similarity between a feature amount Fa of the user A and each of feature amounts Fv11 to Fv15 registered in the database is calculated. For example, the similarity is calculated as illustrated in FIG. 13A. In FIGS. 13A to 13C and the subsequent drawings, the similarity is expressed in one of 10 levels for convenience, and a threshold value for determining that authentication has succeeded is "7". In FIG. 13A, the similarity between the feature amounts Fa and Fv11 is "9", which is larger than the threshold value, and thus, the user A succeeds in authentication.

In addition, once the user A (whose token ID is ID_A) passes through the boarding gate device 14, an entry for the user A is invalidated (see the first row of FIG. 13B). Note that entries invalidated in FIGS. 13A to 13C are colored in gray.

Thereafter, when a user B arrives at the boarding gate device 14, a similarity between a feature amount Fb of the user B and each of the feature amounts Fv12 to Fv15 registered in the database is calculated. For example, the similarity is calculated as illustrated in FIG. 13B. In this case, the similarity between the feature amounts Fb and Fv13 is "9", which is larger than the threshold value, and thus, the user B succeeds in authentication. In addition, the entry having the feature amount with the highest similarity is invalidated (see the third row of FIG. 13C).

Here, an entry associated to the user B is an entry for "ID_B", and erroneous authentication is caused by accepting another person in FIG. 13B. That is, both the similarity between the feature amount Fb and the feature amount Fv12 and the similarity between the feature amount Fb and the feature amount Fv13 are larger than the threshold value. Since these similarities are close to each other and the latter has a larger value, the user B is determined as a user C. In a case where faces of the user B and the user C are similar to each other, such erroneous authentication may unusually occur depending on conditions such as environments where face images are captured. As a result of the erroneous authentication, the entry for the user C is invalidated as described above.

Next, when the user C arrives at the boarding gate device 14, a similarity between the feature amount Fc of the user C and each of the feature amounts Fv12, Fv14, and Fv15 registered in the database is calculated. For example, the similarity is calculated as illustrated in FIG. 13C. In this case, since the similarity exceeding the threshold value "7" cannot be obtained, the user C fails in authentication.

However, the token for the user C is registered in the token ID information database, and it is an expected result that the user C succeeds in authentication. In the second example embodiment, a boarding procedure system for solving the above-described inconvenience will be described.

Note that the configuration of the boarding procedure system according to the second example embodiment can be the same as that according to the first example embodiment, and thus, the description thereof relevant to FIG. 2 will be omitted. In addition, the processing configuration of the server device 20 according to the second example embodiment can also be the same as that according to the first example embodiment, and thus, the description thereof will be omitted.

Hereinafter, differences between the first and second example embodiments will be described.

The authentication request processing unit 404 of the server device 20 receives an authentication request for a second user different from a user (a first user) for which an entry has already been invalidated from one terminal (e.g., the boarding gate device 14) among the plurality of terminals. The authentication request processing unit 404 sets each of valid feature amounts among the feature amounts registered in the token ID information database as a feature amount on the registration side, and executes collation processing.

In a case where authentication has succeeded, the server device 20 executes the subsequent processing, similarly to the first example embodiment.

When authentication has failed, the authentication request processing unit 404 sets each of the plurality of feature amounts registered in the token ID information database as a feature amount on the registration side and executes collation processing. In the example of FIGS. 13A to 13C, when the user C has failed in authentication, the authentication request processing unit 404 sets each of the feature amounts Fv11 to Fv15 as a feature amount on the registration side regardless of what is set in the invalidation flag field, and executes authentication processing. That is, when first-time authentication for the second user has failed, the authentication request processing unit 404 performs second-time authentication, including the previously invalidated entries, for the second user.

If the person to be authenticated (the second user) is not registered in the token ID information database, authentication fails in the second-time collation processing as well. In this case, the authentication request processing unit 404 sets an authentication result for the person to be authenticated as "authentication has failed". When the second-time authentication for the second user has failed, the authentication request processing unit 404 notifies the terminal from which the authentication request is transmitted that the authentication has failed.

However, if the person to be authenticated is registered in the token ID information database, the authentication of the person to be authenticated succeeds in the second-time collation processing. For example, in the example of FIGS. 13A to 13C, as a result of performing the collation processing including the invalid entries, what is illustrated in FIG. 14 is obtained. In this case, since the entry for the user C to which the invalidation flag has been set is also subjected to the collation processing, its similarity exceeds the threshold value and the highest value is obtained.

The fact that the authentication has failed in the first-time collation processing and the authentication has succeeded in the second-time collation processing indicates that it is highly likely that an error of acceptance of another person has already occurred. Therefore, the authentication request processing unit 404 notifies an external device that the "acceptance of another person" has occurred. That is, when the second-time authentication for the second user has succeeded, the authentication request processing unit 404 transmits, to an external device, an "erroneous authentication occurrence notification" indicating that erroneous authentication has occurred before the first-time authentication for the second user.

For example, the authentication request processing unit 404 transmits an erroneous authentication occurrence notification to a terminal (a smartphone, a tablet, or a personal computer) used by an employee of an airline. The erroneous authentication occurrence notification includes identification information (e.g., a boarding gate device identifier) about a terminal that has failed in authentication due to the erroneous authentication that may previously have occurred, and information about a person involved in the erroneous authentication.

Examples of the information about a person involved in the erroneous authentication include at least one of information about a user (the user B in the above-described example) who has previously been erroneously authenticated and information about a user (the user C in the above-described example) who has failed in authentication due to the erroneous authentication.

The user who has failed in authentication due to the erroneous authentication is a user who has failed in first-time authentication and has succeeded in second-time authentication. The user who has previously been erroneously authenticated is a user having the second highest similarity among the similarities calculated in the second-time collation processing. In the above-described example, since the erroneous authentication has occurred because the faces of the user B and the user C are similar to each other, a similarity of the user B is calculated to be high in the collation processing for the user C as illustrated in FIG. 14. Therefore, the user B is a user who has previously been erroneously authenticated.

Figure 15:
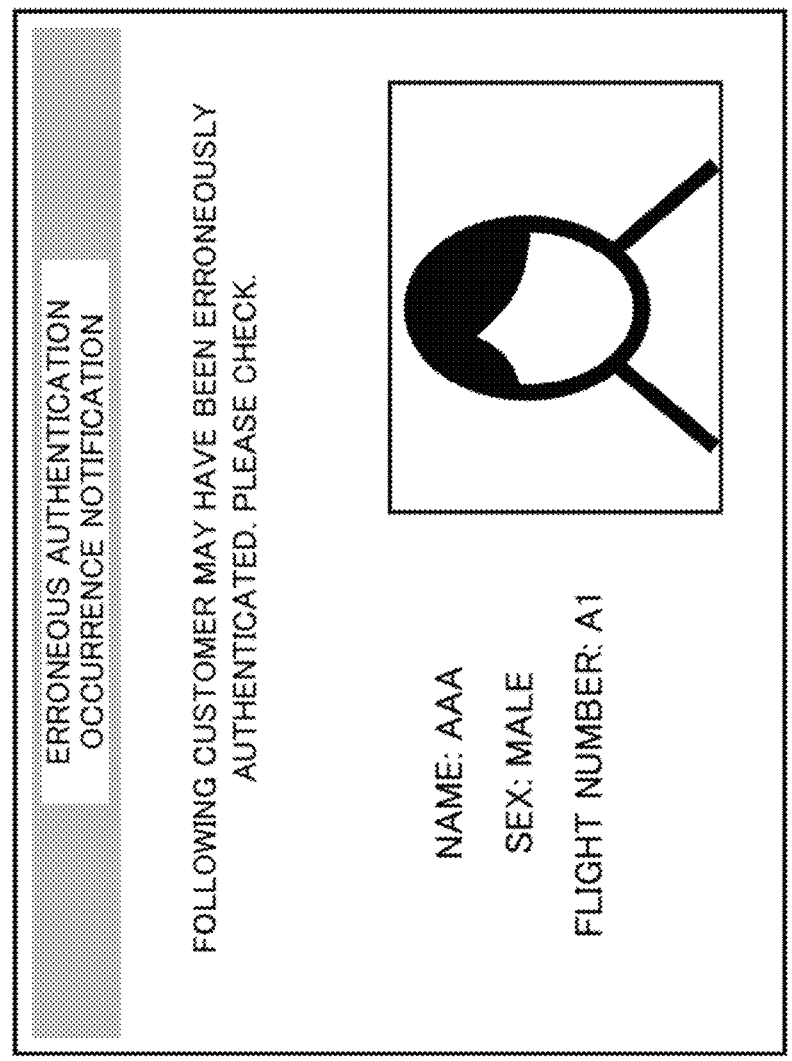
FIG. 15 is a diagram illustrating an example of a display of a terminal used by an employee of an airline according to the second example embodiment.

The authentication request processing unit 404 transmits, as the information about a person involved in the erroneous authentication, a name of the user, a flight number, a destination, etc. to a terminal used by an employee of an airline. This information is obtained by searching the task information database using a token ID as a key. Alternatively, the authentication request processing unit 404 may transmit a face image, a nationality, an age, a sex, flight information, etc. about a person involved in the erroneous authentication to a terminal used by the employee of the airline as the "information about a person involved in the erroneous authentication". In this case, the terminal used by the employee of the airline may perform display as illustrated in FIG. 15.

The employee who has received the information about the user who has failed in authentication due to the previous erroneous authentication goes to the terminal (the touch point) specified by the terminal identifier included in the erroneous authentication occurrence notification, and checks whether erroneous authentication has occurred based on a passport, a boarding pass, etc. of the involved person. In addition, the employee or the like corrects or re-inputs information registered in the DCS if necessary.

In addition, the employee who has received the information about the user who has previously been erroneously authenticated may go to a place (a seat) of the user and request the user to reimplement the procedures. In this case, the employee may operate the terminal to validate the entry for the user registered in the server device 20. Alternatively, the employee may check the passport or the like of the user, and correct the information registered in the DCS when the user is qualified to board the airplane.

When first-time authentication processing has failed and second-time authentication processing has succeeded, the authentication request processing unit 404 may notify the terminal from which the authentication request is transmitted that "authentication has failed", or may transmit an "erroneous authentication occurrence notification" to the terminal from which the authentication request is transmitted.

The terminal (the touch point) that has received the erroneous authentication occurrence notification may instruct the user to stand by on that spot or to go to a manned booth. Alternatively, the terminal (the touch point) may notify the user that the authentication result is being investigated. That is, a message displayed on the terminal (the touch point) when authentication has succeeded in the first-time authentication processing may be different from a message displayed on the terminal when authentication has succeeded in the second-time authentication processing. For example, when authentication has succeeded in the first-time authentication processing, a message such as "the authentication has succeeded" may be output, and when authentication has succeeded in the second-time authentication processing, a message such as "the authentication result is being investigated" may be output. That is, when the first-time authentication of the user has succeeded, the authentication request processing unit 404 notifies the terminal of the success in authentication, so that the terminal can display a message indicating that the authentication has succeeded. Furthermore, when the second-time authentication of the user has succeeded, the authentication request processing unit 404 transmits an erroneous authentication occurrence notification to the terminal, so that the terminal can display a message indicating that the authentication result is being investigated.

Figure 16:
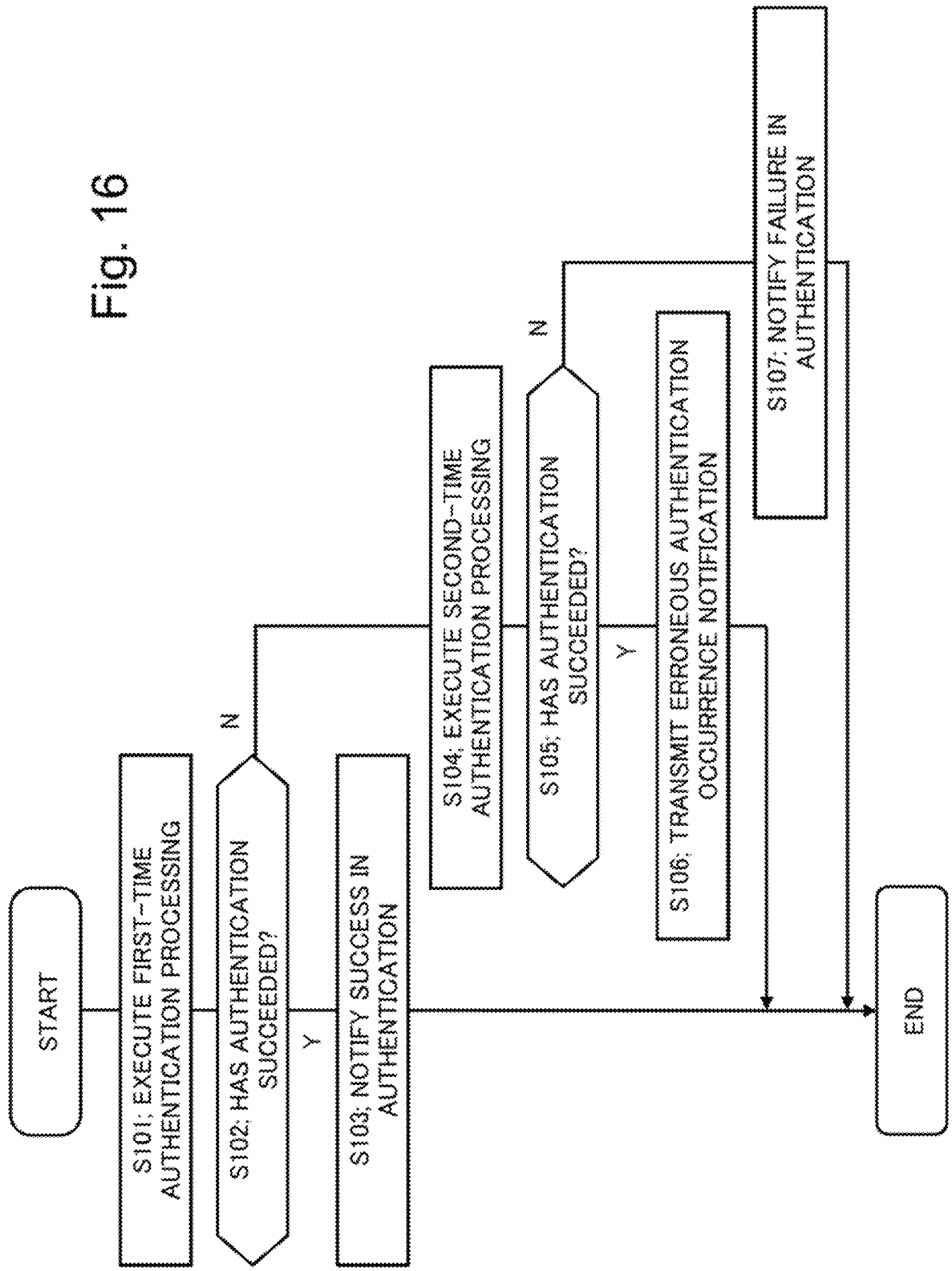
FIG. 16 is a flowchart illustrating an example of an operation of an authentication request processing unit according to the second example embodiment.

The operation of the authentication request processing unit 404 according to the second example embodiment is summarized as a flowchart illustrated in FIG. 16.

When receiving an authentication request from a terminal (a touch point) such as the boarding gate device 14, the server device 20 executes first-time authentication processing for valid entries in the token ID information database (execution of first-time authentication processing; step S101).

When the authentication has succeeded (Yes in step S102), the server device 20 notifies the touch point of the success in authentication (step S103).

When the authentication has failed (No in step S102), the server device 20 executes second-time authentication processing (execution of second-time authentication processing; step S104).

When the second-time authentication has succeeded (Yes in step S105), the server device 20 transmits an erroneous authentication occurrence notification to a terminal used by an employee of an airline or the like (step S106).

When the second-time authentication has failed (No in step S105), the server device 20 notifies the touch point of the failure in authentication (step S107).

As described above, when the biometric authentication of the user has failed, the boarding procedure system according to the second example embodiment executes second-time authentication processing, with invalidated entries in the token ID information database being treated as valid entries. If the biometric authentication of the user fails in the second-time authentication processing as well, the request for authenticating the user is determined as "authentication has failed". On the other hand, if the biometric authentication of the user succeeds in the second-time authentication processing, it is determined that it is highly likely that that an error has occurred in the already-performed authentication. Accordingly, the server device 20 notifies an employee of an airline or the like of information about persons involved in the erroneous authentication (a user who has been erroneously authenticated and a user has failed in authentication as a result of the erroneous authentication) and requests the employee of the airline or the like to correct the error. As a result, it is possible to eliminate inconvenience that a user having a valid qualification is rejected due to erroneous authentication that has previously occurred.

Third Example Embodiment

Next, a third example embodiment will be described in detail with reference to the drawings.

In the second example embodiment, the server device 20 detects an occurrence of erroneous authentication by executing second-time collation processing including the invalidated entries. In the third example embodiment, a case where when an entry has been invalidated, the server device 20 detects an occurrence of erroneous authentication by notifying a person who has succeeded in authentication (a person having passed through the boarding gate device 14) that the entry has been invalidated will be described.

Figure 17:
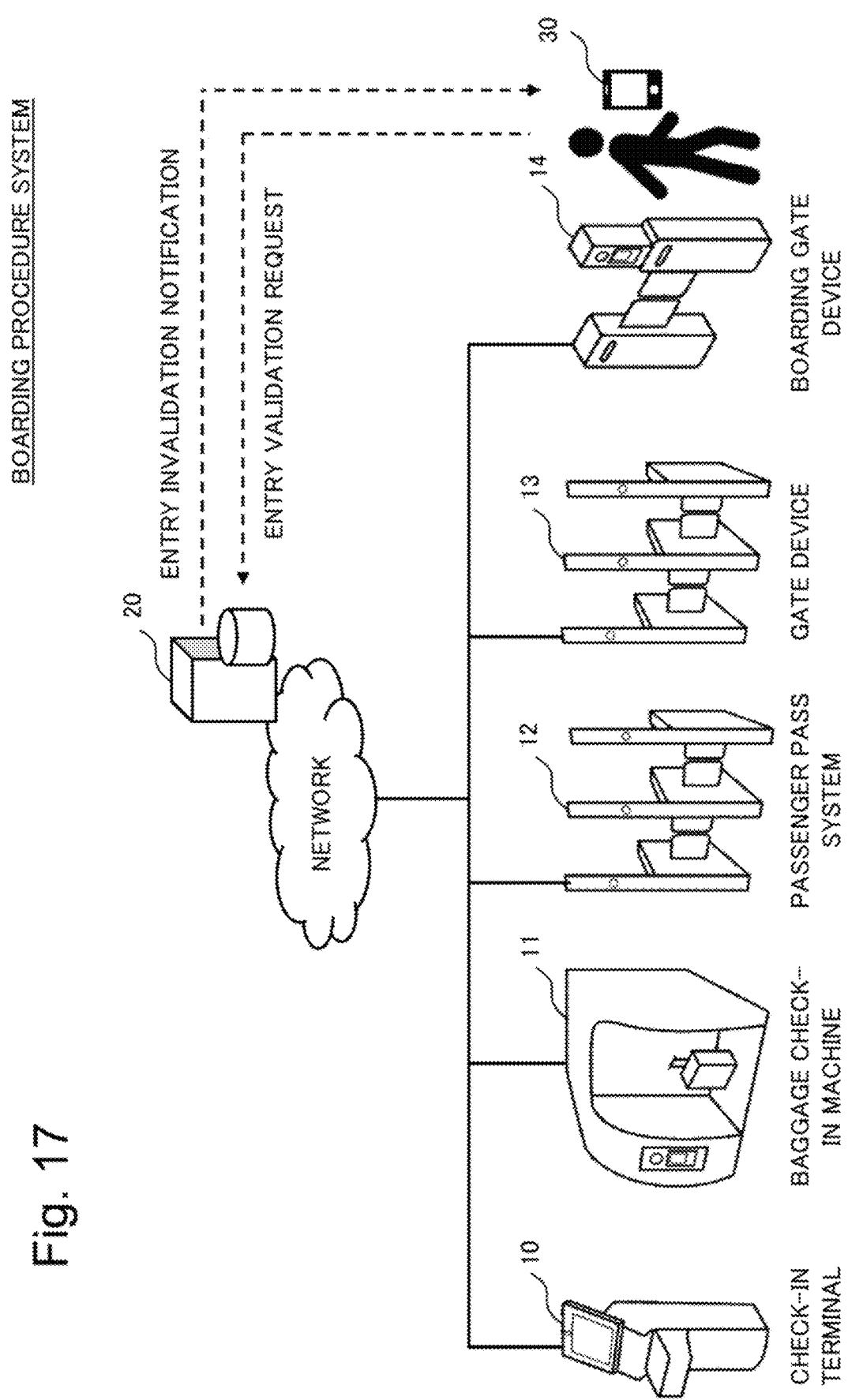
FIG. 17 is a diagram illustrating an example of a schematic configuration of a boarding procedure system according to a third example embodiment.

FIG. 17 is a diagram illustrating an example of a schematic configuration of a boarding procedure system according to a third example embodiment. As illustrated in FIG. 17, a user possesses a user terminal 30. Examples of the user terminal 30 include mobile terminal devices such as a smartphone, a mobile phone, a game machine, and a tablet.

Figure 18:
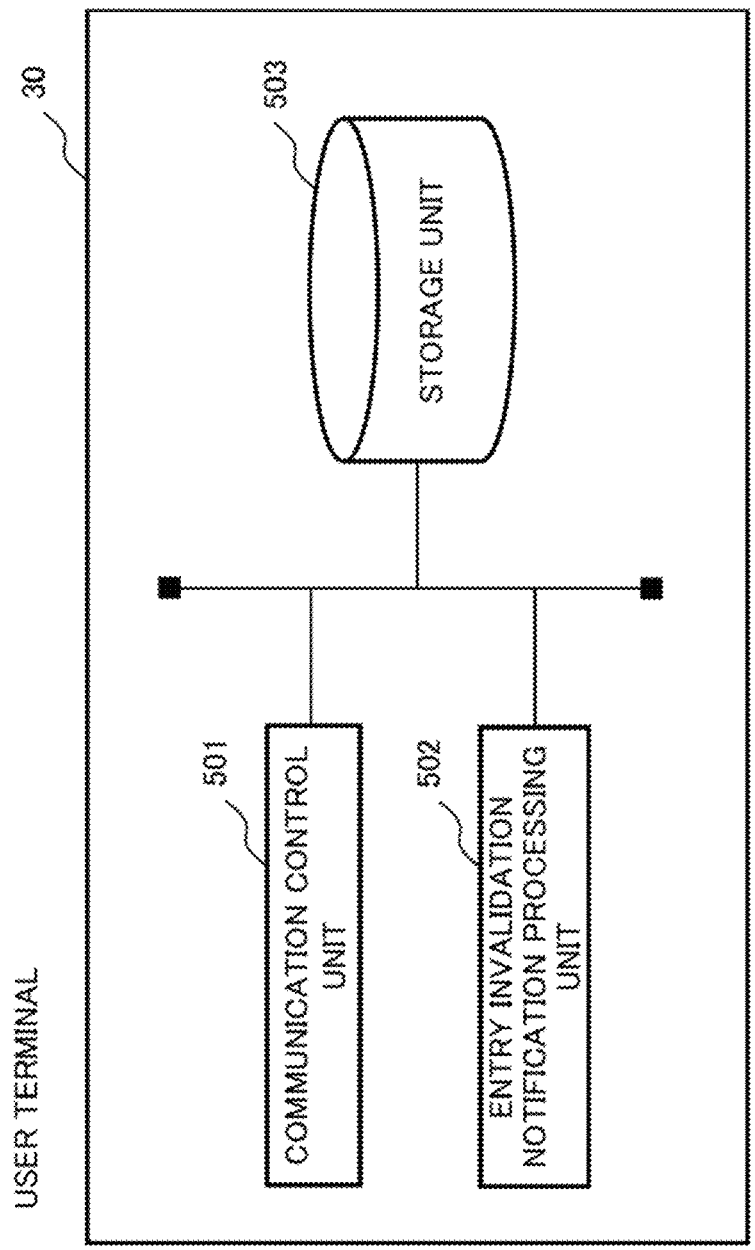
FIG. 18 is a diagram illustrating an example of a processing configuration of a user terminal according to the third example embodiment.

FIG. 18 is a diagram illustrating an example of a processing configuration (processing modules) of the user terminal 30 according to the third example embodiment. Referring to FIG. 18, the user terminal 30 includes a communication control unit 501, an entry invalidation notification processing unit 502, and a storage unit 503.

The communication control unit 501 is a means for controlling communication with another device. For example, the communication control unit 501 receives data (packet) from the server device 20. Also, the communication control unit 501 transmits data to the server device 20. The communication control unit 501 delivers data received from another device to another processing module. The communication control unit 501 transmits data acquired from another processing module to another device. In this manner, another processing module transmits and receives data to and from another device via the communication control unit 501.

Details of the entry invalidation notification processing unit 502 will be described below.

The storage unit 503 stores information required for operating the user terminal 30.

The processing configuration of the server device 20 according to the third example embodiment can also be the same as that according to the first example embodiment, and thus, the description thereof will be omitted.

Hereinafter, differences between the first to third example embodiments will be described.

In token ID information database according to the third example embodiment, a contact address of the user (e.g., an email address or the like at which the user terminal 30 is capable of transmitting and receiving emails) is registered. For example, the server device 20 acquires the contact address at the time of registering the user in the system.

When receiving a gate pass notification from the boarding gate device 14 and invalidating an associated entry, the database management unit 403 of the server device 20 transmits an "entry invalidation notification" to the contact address described in the contact address field of the invalidated entry.

Figure 19:
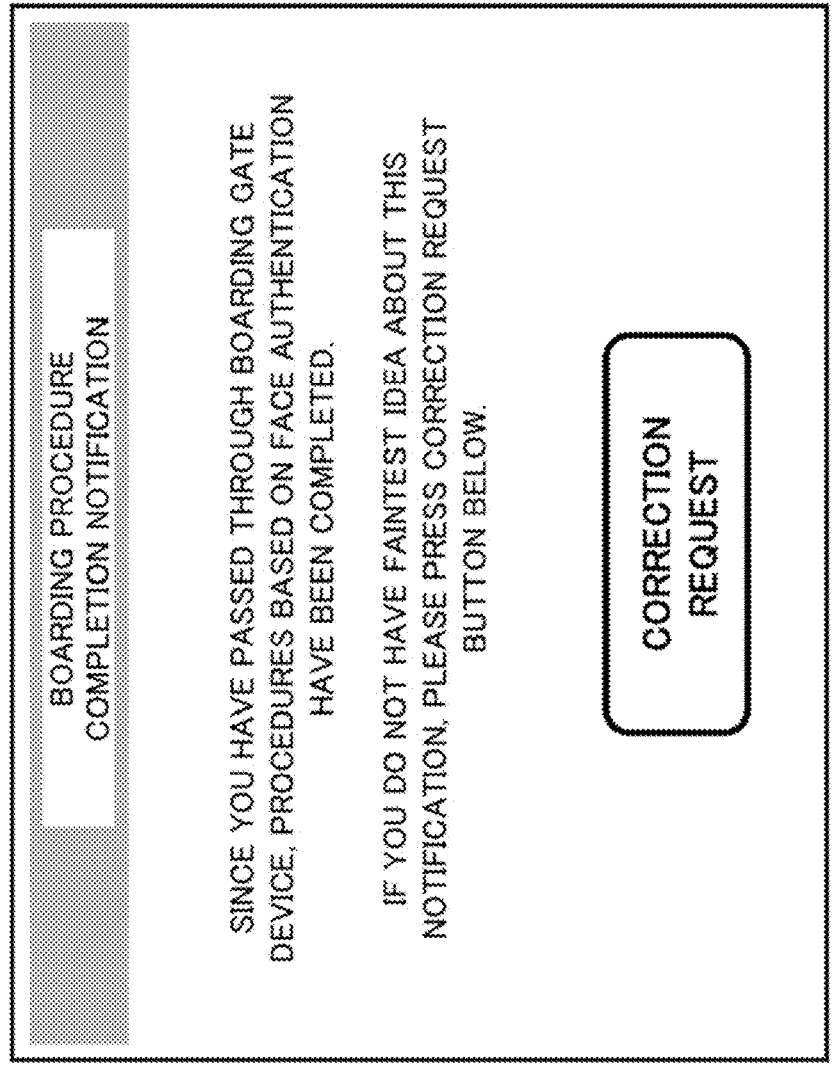
FIG. 19 is a diagram illustrating an example of a display by the user terminal according to the third example embodiment.

Upon receiving the notification, the entry invalidation notification processing unit 502 displays, for example, a message such as "Since you have passed through the boarding gate device, the procedures based on face authentication have been completed." (see FIG. 19). If the user has truly passed through the boarding gate device 14, the user does not need to take any action even though the user has received the message. This is because the user does not feel suspicious.

On the other hand, if a user who has not passed through the boarding gate device 14 receives the message, the user recognizes that the notification is wrong. This is because the user has not passed through the boarding gate device 14 and the user has not completed the boarding procedures. In this case, the user presses a "correction request" button.

When the correction request button is pressed, the entry invalidation notification processing unit 502 transmits an "entry validation request" to the server device 20.

Figure 20:
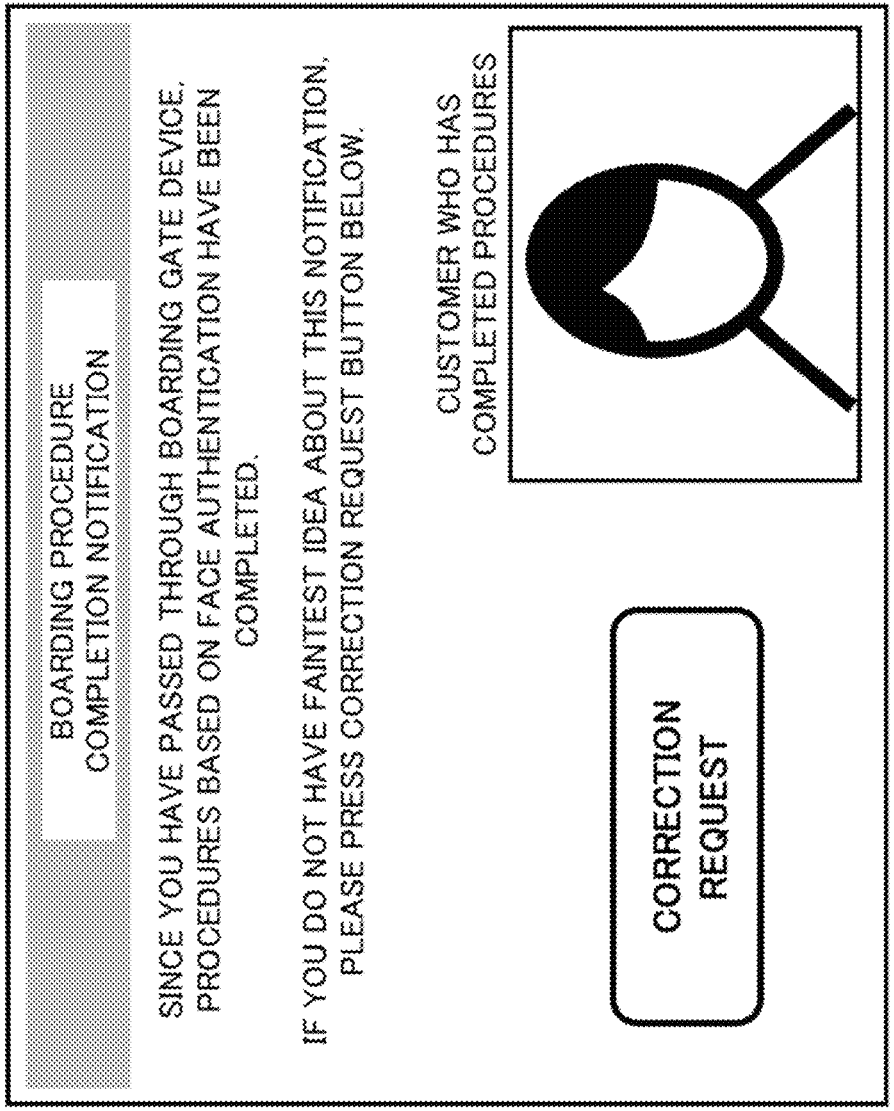
FIG. 20 is a diagram illustrating an example of a display by the user terminal according to the third example embodiment.

Also, the database management unit 403 may add a face image of a person who has completed the procedures to the entry invalidation notification. In this case, the entry invalidation notification processing unit 502 of the user terminal 30 can perform display as illustrated in FIG. 20. The user can more accurately determine whether to press the "correction request" button by checking whether the displayed face image is a his/her face image.

The database management unit 403 that has received the entry validation request searches the token ID information database using the address (the contact address) of the user terminal 30 from which the entry validation request is transmitted as a key, and specifies an associated entry. The database management unit 403 clears the invalidation flag field of the specified entry from "1" to "0".

By validating the entry that has been invalidated once, the authentication of the user who has not completed the boarding procedures does not fail.

When the entry is validated in accordance with the entry validation request, the database management unit 403 notifies an employee of an airline or the like of the fact. That is, the server device 20 notifies the airline or the like of possibility that an error may occur resulting from the acceptance of another person. Specifically, the server device 20 notifies the employee of the airline (a terminal used by the employee) of a name, a flight number, a face image, etc. of the passenger for which the entry has been validated. The employee of the airline or the like specifies a user who has been erroneously authenticated using the above-described information (in particular, the face image of the passenger) as a clue. The employee or the like of the airline checks a boarding pass, a passport, and the like for each passenger of the airplane, and corrects the information in the DCS or the like.

As described above, in the third example embodiment, when an entry is invalidated, the server device 20 notifies a user (the user terminal 30) of the fact. By validating the invalidated entry, a user who does not remember passing through the boarding gate device 14 can be correctly authenticated. In addition, since the server device 20 notifies the airline of possibility that erroneous authentication may occur based on the notification from the user, an error resulting from the erroneous authentication is correctly corrected.

Figure 21:
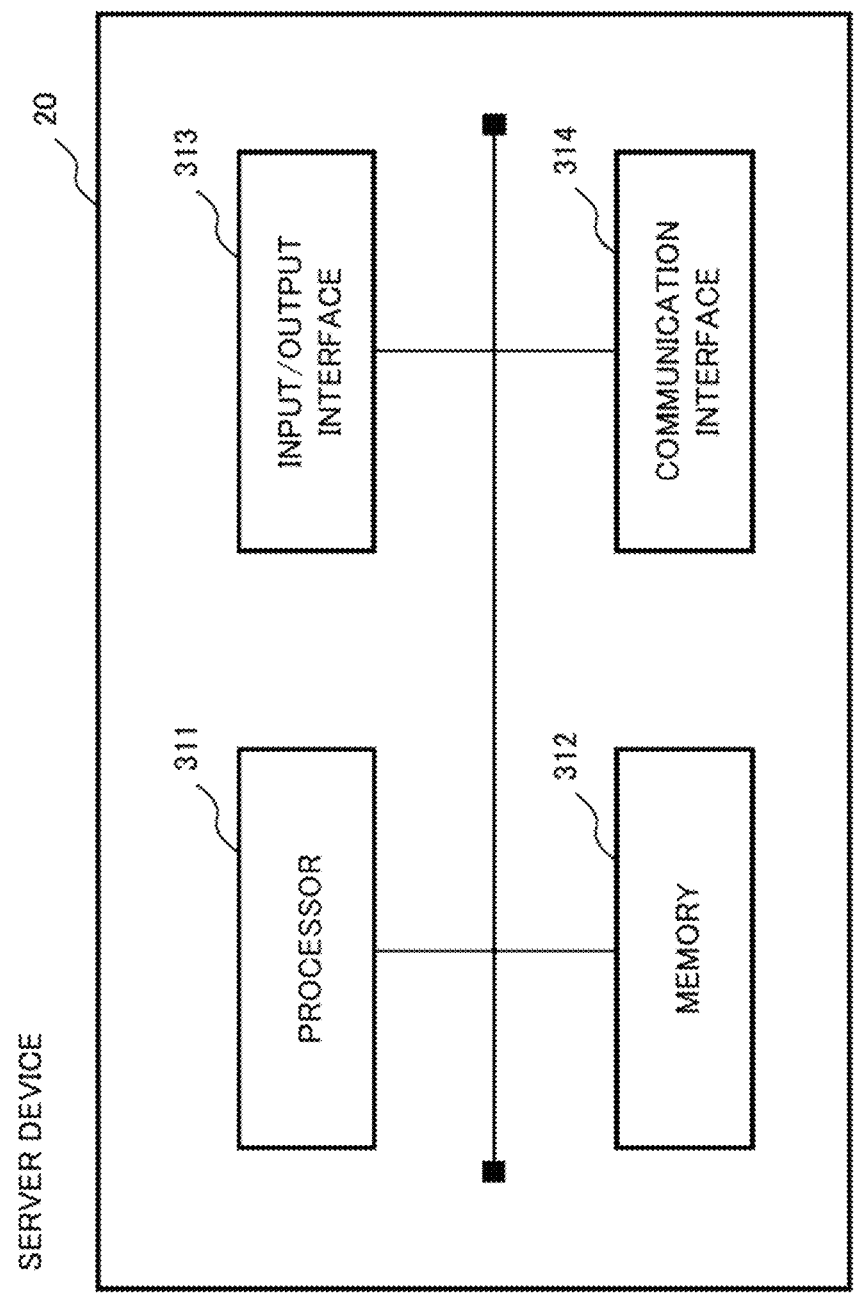
FIG. 21 is a diagram illustrating an example of a hardware configuration of the server device.

Next, hardware of each of the devices constituting the boarding procedure system will be described. FIG. 21 is a diagram illustrating an example of a hardware configuration of the server device 20.

The server device 20 can be configured by an information processing device (a so-called computer), and has a configuration illustrated in FIG. 21. For example, the server device 20 includes a processor 311, a memory 312, an input/output interface 313, a communication interface 314, etc. The components such as the processor 311 are connected to each other by an internal bus or the like, and are configured to be able to communicate with each other.

However, the configuration illustrated in FIG. 21 is not intended to limit the hardware configuration of the server device 20. The server device 20 may include hardware that is not illustrated, or may not include the input/output interface 313 if necessary. In addition, the number of processors 311 and the like included in the server device 20 is not limited to the example of FIG. 21, and for example, a plurality of processors 311 may be included in the server device 20.

The processor 311 is a programmable device, e.g., a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various kinds of data.

The input/output interface 313 is an interface of a display device or an input device that is not illustrated. The display device is, for example, a liquid crystal display or the like. The input device is, for example, a device that receives a user's operation such as a keyboard or a mouse.

The communication interface 314 is a circuit, a module, or the like that communicates with another device. For example, the communication interface 314 includes a network interface card (NIC) or the like.

The functions of the server device 20 are achieved by various processing modules. The processing modules are implemented, for example, by the processor 311 executing the programs stored in the memory 312. Furthermore, the program can be recorded in a computer-readable recording medium. The recording medium may be a non-transient (non-transitory) medium such as a semiconductor memory, a hard disk, a magnetic recording medium, or an optical recording medium. That is, the present invention can also be embodied as a computer program product. Furthermore, the program can be downloaded via a network or updated using a recording medium storing the program. Furthermore, the processing module may be implemented by a semiconductor chip.

Note that the check-in terminal 10, the boarding gate device 14, the user terminal 30, and the like can also be configured by information processing devices similarly to the server device 20, and they are not different in basic hardware configuration from the server device 20, and thus, the description thereof will be omitted. The check-in terminal 10 or the like may include a camera or the like.

The server device 20 has a computer mounted thereon, and the functions of the server device 20 can be achieved by causing the computer to execute the program. In addition, the server device 20 executes a control method thereof through the program.

[Modifications]

Note that the configuration, operation, and the like of the boarding procedure system described in each of the above-described example embodiments are merely exemplary, and are not intended to limit the configuration and the like of the system.

In each of the above-described example embodiments, it has been described that a user is registered in the system after the check-in procedure, but the system registration may be performed before the check-in procedure. In this case, since a boarding pass is not issued before the check-in procedure, the server device 20 may register the user in the system using airline ticket information instead of the boarding pass.

In each of the above-described example embodiments, the case where the system registration (registration for taking boarding procedures using biometric authentication) is performed by the check-in terminal 10 has been described. However, the system registration may be performed by a device or a terminal other than the check-in terminal 10. For example, a device dedicated to system registration may be installed at the airport, or the system registration may be performed by a terminal (a touch point) such as the baggage check-in machine 11 or the passenger pass system 12.

In each of the above-described example embodiments, the case where the series of boarding procedures are performed through biometric authentication has been described, but only some of the procedures may be performed through biometric authentication. For example, in FIG. 2, the system registration may be performed by the baggage check-in machine 11, and the procedures (the security check and the like) after baggage is checked in may be performed through biometric authentication. In other words, some procedures among the series of boarding procedures may be performed in manned booths or the like.

In each of the above-described example embodiments, the case where the server device 20 includes two databases has been described. However, the token ID information database and/or the task information database constructed in the server device 20 may be constructed in a database server different from the server device 20. That is, the boarding procedure system only needs to include the various means (e.g., the token generation means) described in each of the above-described example embodiments.

In each of the above-described example embodiments, the case where the authentication request includes a face image has been described, but the authentication request may include a feature amount generated from the face image. In this case, the server device 20 may process the authentication request using the feature amount extracted from the authentication request and the feature amount registered in the token ID information database.

The server device 20 may delete an invalidated entry after a predetermined period has elapsed since the entry was invalidated. More specifically, the database management unit 403 may periodically refer to the invalidation time field of the token ID information database, and delete an entry for which a predetermined period (e.g., 24 hours) has elapsed from the invalidation of the entry.

In the second example embodiment, it has been described that entries stored in the token ID information database are subjected to collation regardless of whether each of the entries is valid or invalid in the second-time authentication processing. However, in the second-time authentication processing, only the entries that have already been invalidated may be subjected to collation. A result of the first-time authentication processing (similarities of valid entries) and a result of the second-time authentication processing (similarities of invalid entries) are integrated, and the result of the second-time authentication processing (similarities; scores) described in the second example embodiment may be calculated. In the example of FIG. 13C, similarities for the entries in the second, fourth, and fifth rows are calculated in the first-time authentication processing, and similarities for the entries in the first and third rows are calculated in the second-time authentication processing. By integrating the similarities obtained by the two-time authentication processing, the similarities illustrated in FIG. 14 are obtained. That is, in the second-time authentication processing where collation is subjected to the invalidated entries, since the user B who has been erroneously authenticated is not specified, it is necessary to integrate the similarities obtained by the two-time authentication processing.

A form of data transmission and reception between the check-in terminal 10 and the like and the server device 20 is not particularly limited, but data transmitted and received between the devices may be encrypted. In order to appropriately protect personal information included in the boarding pass information and the passport information, it is preferable to transmit and receive encrypted data.

In each of the above-described example embodiments, the case where an entry is invalidated has been described, but the server device 20 may store a history of similarities (scores) calculated in the authentication processing (collation processing) without invalidating the entry. The server device 20 may detect an occurrence of erroneous authentication through a countermeasure. Specifically, the server device 20 checks a history of similarities every time authentication processing is executed. At that time, when authentication has succeeded for a user having a high similarity ex post facto, the server device 20 determines that it is highly likely that erroneous authentication may have occurred. In this case, the server device 20 notifies an employee of an airline or the like of the fact together with information on the person specified from the history of similarities (the person who has previously been erroneously authenticated), and requests the employee of the airline or the like to take an appropriate countermeasure.

In the flow charts (flowcharts or sequence diagrams) used in the above description, a plurality of steps (processes) are described in order, but an order in which the steps are executed according to the example embodiments is not limited to the described order. According to the example embodiments, the order of the steps as illustrated can be changed without departing from the gist, for example, by executing the processes in parallel.

The above example embodiments have been described in detail to make it easy to understand the present disclosure, and it is not intended that all the configurations described above are necessary. In addition, in a case where a plurality of example embodiments have been described, the example embodiments may be used each alone or in combination. For example, some configurations of one example embodiment can be replaced with configurations of another example embodiment, or configurations of one example embodiment can be added to configurations of another example embodiment. Furthermore, some configurations of each example embodiment can be deleted, or added or replaced to or with other configurations.

Although the industrial applicability of the present invention is apparent from the above description, the present invention can be preferably applied to a boarding procedure system at an airport or the like. However, the application of the present disclosure is not limited to a procedure at the airport, and the present disclosure can be applied to a system requiring a plurality of procedures.

Some or all of the above-described example embodiments can be described as in the following supplementary notes, but are not limited to the following supplementary notes.

[Supplementary Note 1]

A server device including:
  a management unit that manages a database storing biometric information about each of a plurality of users; and a processing unit that processes an authentication request from each of a plurality of terminals including a gate device at a last stage in a series of procedures with reference to the database,
in which when a first user who has succeeded in authentication passes through the gate device, the management unit invalidates an entry of the first user stored in the database.

[Supplementary Note 2]

The server device according to supplementary note 1, in which the management unit recognizes that the first user has passed through the gate device by receiving, from the gate device, a gate pass notification indicating that the first user has passed through the gate device.

[Supplementary Note 3]

The server device according to supplementary note 2, in which the database includes an invalidation flag field indicating whether an entry of each of the plurality of users is invalid, and
upon receiving the gate pass notification, the management unit sets a value indicating that the entry is invalid in the invalidation flag field associated to the first user.

[Supplementary Note 4]

The server device according to any one of supplementary notes 1 to 3, in which in a case where the processing unit receives an authentication request for a second user from one of the plurality of terminals, when the processing unit has failed in first-time authentication for the second user, the processing unit performs second-time authentication for the second user including the invalidated entry.

[Supplementary Note 5]

The server device according to supplementary note 4, in which when the processing unit has succeeded in the second-time authentication for the second user, the processing unit transmits, to an external device, an erroneous authentication occurrence notification indicating that erroneous authentication has occurred before the first-time authentication for the second user.

[Supplementary Note 6]

The server device according to supplementary note 5, in which the erroneous authentication occurrence notification includes information about the second user.

[Supplementary Note 7]

The server device according to supplementary note 6, in which in a case where the gate device is an automated boarding gates (ABG) terminal installed at an airport,
the erroneous authentication occurrence notification includes a name and a flight number of the second user.

[Supplementary Note 8]

The server device according to any one of supplementary notes 4 to 7, in which when the processing unit has failed in the second-time authentication for the second user, the processing unit notifies the one terminal of the failure in authentication.

[Supplementary Note 9]

The server device according to any one of supplementary notes 1 to 8, in which the biometric information is a face image or a feature amount generated from the face image.

[Supplementary Note 10]

The server device according to supplementary note 2 or 3, in which when receiving the gate pass notification, the management unit invalidates the entry of the first user, and transmits an entry invalidation notification to a user terminal possessed by the first user, and
when receiving an entry validation request from the user terminal, the management unit validates the invalidated entry of the first user.

[Supplementary Note 11]

The server device according to supplementary note 5 or 6, in which when the processing unit has succeeded in the first-time authentication for the second user, the processing unit notifies the one terminal of the success in authentication to enable the one terminal to display a message indicating the success in authentication, and
when the processing unit has succeeded in the second-time authentication for the second user, the processing unit transmits the erroneous authentication occurrence notification to the one terminal to enable the one terminal to display a message indicating that an authentication result is being investigated.

[Supplementary Note 12]

A system including:
a plurality of terminals including a gate device at a last stage in a series of procedures; and
a server device connected to the plurality of terminals,
the server device including:
a management unit that manages a database storing biometric information about each of a plurality of users; and
a processing unit that processes an authentication request from each of the plurality of terminals with reference to the database,
in which when a first user who has succeeded in authentication passes through the gate device, the management unit invalidates an entry of the first user stored in the database.

[Supplementary Note 13]

A control method for a server device including a database that stores biometric information about each of a plurality of users, the control method including:
executing biometric authentication with reference to the database when receiving an authentication request from each of a plurality of terminals including a gate device at a last stage in a series of procedures; and
invalidating an entry of a first user stored in the database when the first user who has succeeded in authentication passes through the gate device.

[Supplementary Note 14]

A computer-readable recording medium storing a program for causing a computer mounted on a server device including a database that stores biometric information about each of a plurality of users to execute processing including:
executing biometric authentication with reference to the database when receiving an authentication request from each of a plurality of terminals including a gate device at a last stage in a series of procedures; and
invalidating an entry of a first user stored in the database when the first user who has succeeded in authentication passes through the gate device.

Note that the disclosures of the cited prior art documents are incorporated herein by reference. Although the example embodiments of the present invention have been described above, the present invention is not limited to these example embodiments. It will be understood by those skilled in the art that these example embodiments are merely exemplary and various changes may be made without departing from the scope and spirit of the present invention. That is, it goes without saying that the present invention includes various modifications and alterations that may be made by those skilled in the art in accordance with the entire disclosure including the claims and the technical idea.

REFERENCE SIGNS LIST 10 check-in terminal
11 baggage check-in machine 12 passenger pass system
13 gate device
14 boarding gate device
20, 100 server device
30 user terminal
101 management unit
102 processing unit
201, 301, 401, 501 communication control unit
202 system registration unit
203 token issue request unit
204 message output unit
205 check-in execution unit
206, 305, 405, 503 storage unit
211 boarding pass information acquisition unit
212 passport information acquisition unit
213, 302 biometric information acquisition unit
303 authentication request unit
304 function implementation unit
311 processor
312 memory
313 input/output interface
314 communication interface
402 token generation unit
403 database management unit
404 authentication request processing unit
502 entry invalidation notification processing unit

What is claimed is:

1. A server device comprising:
a memory storing instructions; and
at least one processor configured to execute the instructions to:
manage a database storing a plurality of entries, each of the plurality of entries being associated with each of a plurality of users and including biometric information about each of the plurality of users; and
process an authentication request from each of a plurality of terminals including a gate device at a last stage in a series of procedures with reference to the database, the authentication request being processed using one-to-N collation processing by referring to the plurality of entries in the database,
wherein in response to a first user who has succeeded in authentication passes through the gate device, the at least one processor invalidates an entry of the first user stored in the database, and
wherein an invalidated entry stored in the database is not referred to in the one-to-N collation processing.

2. The server device according to claim 1, wherein the at least one processor recognizes that the first user has passed through the gate device by receiving, from the gate device, a gate pass notification indicating that the first user has passed through the gate device.

3. The server device according to claim 2, wherein the database includes an invalidation flag field indicating whether an entry of each of the plurality of users is invalid, and
upon receiving the gate pass notification, the at least one processor sets a value indicating that the entry is invalid in the invalidation flag field associated to the first user.

4. The server device according to claim 2, wherein when receiving the gate pass notification, the at least one processor invalidates the entry of the first user, and transmits an entry invalidation notification to a user terminal possessed by the first user, and
when receiving an entry validation request from the user terminal, the at least one processor validates the invalidated entry of the first user.

5. The server device according claim 1, wherein in a case where the at least one processor receives an authentication request for a second user from one of the plurality of terminals, when the at least one processor has failed in first-time authentication for the second user, the at least one processor performs second-time authentication for the second user including the invalidated entry.

6. The server device according to claim 5, wherein when the at least one processor has succeeded in the second-time authentication for the second user, the at least one processor transmits, to an external device, an erroneous authentication occurrence notification indicating that erroneous authentication has occurred before the first-time authentication for the second user.

7. The server device according to claim 6, wherein the erroneous authentication occurrence notification includes information about the second user.

8. The server device according to claim 7, wherein in a case where the gate device is an automated boarding gates (ABG) terminal installed at an airport,
the erroneous authentication occurrence notification includes a name and a flight number of the second user.

9. The server device according to claim 6, wherein when the at least one processor has succeeded in the first-time authentication for the second user, the at least one processor notifies one terminal of the success in authentication to enable the one terminal to display a message indicating the success in authentication, and
when the at least one processor has succeeded in the second-time authentication for the second user, the at least one processor transmits the erroneous authentication occurrence notification to the one terminal to enable the one terminal to display a message indicating that an authentication result is being investigated.

10. The server device according to claim 5, wherein when the at least one processor has failed in the second-time authentication for the second user, the at least one processor notifies one terminal of the failure in authentication.

11. The server device according to claim 1, wherein the biometric information is a face image or a feature amount generated from the face image.

12. A system comprising:
a plurality of terminals including a gate device at a last stage in a series of procedures; and
a server device connected to the plurality of terminals,
the server device including:
a memory storing instructions; and
at least one processor configured to execute the instructions to:
manage a database storing a plurality of entries, each of the plurality of entries being associated with each of a plurality of users and including biometric information about each of the plurality of users; and
process an authentication request from each of the plurality of terminals with reference to the database, the authentication request being processed using one-to-N collation processing by referring to the plurality of entries in the database,
wherein in response to a first user who has succeeded in authentication passes through the gate device, the at least one processor invalidates an entry of the first user stored in the database, and
wherein an invalidated entry stored in the database is not referred to in the one-to-N collation processing.

13. A control method performed by a server device comprising a database that stores a plurality of entries, each of the plurality of entries being associated with each of a plurality of users and including biometric information about each of the plurality of users, wherein the control method comprises:

executing biometric authentication with reference to the database when receiving an authentication request from each of a plurality of terminals including a gate device at a last stage in a series of procedures, the authentication request being executed using one-to-N collation processing by referring to the plurality of entries in the database; and invalidating an entry of a first user stored in the database in response to the first user who has succeeded in authentication passes through the gate device, wherein an invalidated entry stored in the database is not referred to in the one-to-N collation processing.

\* \* \* \* \*